(12) United States Patent
Wu et al.

(10) Patent No.: US 11,469,866 B2
(45) Date of Patent: Oct. 11, 2022

(54) NON-ORTHOGONAL MULTIPLE ACCESS CONFIGURATION IN SPLIT BASE STATION ARCHITECTURES

(71) Applicant: Google LLC, Mountain View, CA (US)

(72) Inventors: Chih-Hsiang Wu, Taoyuan (TW); Kao-Peng Chou, Taipei (TW)

(73) Assignee: Google LLC, Mountain View, CA (US)

( * ) Notice: Subject to any disclaimer, the term of this patent is extended or adjusted under 35 U.S.C. 154(b) by 25 days.

(21) Appl. No.: 17/260,862

(22) PCT Filed: Sep. 26, 2019

(86) PCT No.: PCT/US2019/053105
§ 371 (c)(1),
(2) Date: Jan. 15, 2021

(87) PCT Pub. No.: WO2020/069090
PCT Pub. Date: Apr. 2, 2020

(65) Prior Publication Data
US 2021/0266124 A1    Aug. 26, 2021

Related U.S. Application Data

(60) Provisional application No. 62/737,025, filed on Sep. 26, 2018.

(51) Int. Cl.
*H04L 5/00* (2006.01)
*H04W 74/00* (2009.01)

(52) U.S. Cl.
CPC ......... *H04L 5/0037* (2013.01); *H04W 74/006* (2013.01)

(58) Field of Classification Search
CPC .......................... H04L 5/0037; H04W 74/006
See application file for complete search history.

(56) References Cited

U.S. PATENT DOCUMENTS 9,131,457 B2    9/2015   Nam et al.
9,712,272 B2    7/2017   Zhu et al.
(Continued)

FOREIGN PATENT DOCUMENTS

EP    3068060        9/2016
WO    2016188312    12/2016
(Continued)

OTHER PUBLICATIONS

"3GPP TS 24.501 V16.3.0", 3GPP TS 24.501 version 16.3.0, Dec. 2019, 645 pages.
(Continued)

*Primary Examiner* — Ajay Cattungal
(74) *Attorney, Agent, or Firm* — Colby Nipper PLLC

(57) ABSTRACT

The present disclosure describes techniques and apparatuses for non-orthogonal multiple access (NOMA) configuration procedures in split base station architectures, including the configuration of user equipment (UE) for NOMA transmission. The base station receives a trigger relating to a UE. Responsive to the trigger, the base station configures the UE to perform NOMA transmission by at least one of a Central Unit of the base station transmitting a first message including the NOMA configuration to a Distributed Unit of the base station and transmitting a second message including the NOMA configuration to the UE, the Central Unit transmitting the second message including the NOMA configuration to the UE, or the Distributed Unit transmitting a third message including the NOMA configuration to the Central Unit and the Central Unit transmitting the second message including the NOMA configuration to the UE.

20 Claims, 15 Drawing Sheets

(56) References Cited

U.S. PATENT DOCUMENTS

| | | | |
|---|---|---|---|
| 9,794,924 B2 | 10/2017 | Lee et al. |
| 10,218,422 B2 | 2/2019 | Raghavan et al. |
| 10,701,684 B2 | 6/2020 | Yoo et al. |
| 10,750,488 B2 | 8/2020 | He et al. |
| 10,904,868 B2 | 1/2021 | Lei et al. |
| 11,063,705 B2 | 7/2021 | Chou |
| 11,108,440 B2 | 8/2021 | Cha et al. |
| 2011/0158117 A1 | 6/2011 | Ho et al. |
| 2013/0028213 A1 | 1/2013 | Ko et al. |
| 2015/0195795 A1 | 7/2015 | Loehr et al. |
| 2016/0066345 A1 | 3/2016 | Sun et al. |
| 2016/0323832 A1 | 11/2016 | Love et al. |
| 2017/0012754 A1 | 1/2017 | Sun et al. |
| 2017/0078333 A1 | 3/2017 | Tevlin |
| 2017/0251462 A1 | 8/2017 | Chae et al. |
| 2017/0310417 A1 | 10/2017 | Jung et al. |
| 2017/0331573 A1 | 11/2017 | Li |
| 2018/0048348 A1 | 2/2018 | Gau et al. |
| 2018/0049190 A1 | 2/2018 | Abedini et al. |
| 2018/0070274 A1 | 3/2018 | Ode |
| 2018/0070335 A1 | 3/2018 | Amuru et al. |
| 2018/0077685 A1 | 3/2018 | Wu et al. |
| 2018/0115386 A1 | 4/2018 | Shin et al. |
| 2018/0123765 A1 | 5/2018 | Cao et al. |
| 2018/0124684 A1 | 5/2018 | Kwon et al. |
| 2018/0139774 A1 | 5/2018 | Ma et al. |
| 2018/0145797 A1 | 5/2018 | Yeo et al. |
| 2018/0152907 A1 | 5/2018 | Zhang et al. |
| 2018/0167932 A1 | 6/2018 | Papasakellariou |
| 2018/0199359 A1 | 7/2018 | Cao et al. |
| 2018/0302191 A1 | 10/2018 | Park et al. |
| 2018/0337816 A1* | 11/2018 | Herath | H04W 72/042 |
| 2019/0045489 A1 | 2/2019 | He et al. |
| 2019/0053226 A1 | 2/2019 | Xiong et al. |
| 2019/0081657 A1 | 3/2019 | Zeng et al. |
| 2019/0082456 A1 | 3/2019 | Kim et al. |
| 2019/0098657 A1 | 3/2019 | Elbwart et al. |
| 2019/0132076 A1* | 5/2019 | Cheng | H04L 5/003 |
| 2019/0132870 A1* | 5/2019 | Guey | H04W 74/08 |
| 2019/0158338 A1* | 5/2019 | Herath | H04L 27/3488 |
| 2019/0174472 A1 | 6/2019 | Lee et al. |
| 2019/0190753 A1* | 6/2019 | Bayesteh | H04L 27/26 |
| 2019/0289628 A1 | 9/2019 | Xiong et al. |
| 2019/0312694 A1* | 10/2019 | Jia | H04L 1/003 |
| 2019/0313402 A1 | 10/2019 | Lei et al. |
| 2019/0363846 A1 | 11/2019 | Lei et al. |
| 2019/0386783 A1* | 12/2019 | Chou | H04W 72/042 |
| 2020/0014457 A1 | 1/2020 | Tang |
| 2020/0059322 A1 | 2/2020 | Lei et al. |
| 2020/0077402 A1* | 3/2020 | Lei | H04L 5/0021 |
| 2020/0092057 A1* | 3/2020 | Herath | H04L 1/0016 |
| 2020/0119958 A1 | 4/2020 | Bayesteh et al. |
| 2020/0154442 A1 | 5/2020 | Zhou |
| 2020/0154481 A1 | 5/2020 | Goto et al. |
| 2020/0196335 A1 | 6/2020 | Lei et al. |
| 2020/0213901 A1 | 7/2020 | Yoshimoto et al. |
| 2020/0404634 A1 | 12/2020 | He et al. |
| 2021/0029693 A1 | 1/2021 | Meng |
| 2021/0045181 A1 | 2/2021 | Li et al. |
| 2021/0135825 A1 | 5/2021 | Pan et al. |
| 2021/0203465 A1 | 7/2021 | Meng et al. |
| 2021/0211171 A1 | 7/2021 | Meng |
| 2021/0307003 A1 | 9/2021 | Chou |

FOREIGN PATENT DOCUMENTS

| | | |
|---|---|---|
| WO | 2017050760 | 3/2017 |
| WO | 2017055271 | 4/2017 |
| WO | 201702950 | 6/2017 |
| WO | 2017167198 | 10/2017 |
| WO | 2017194001 | 11/2017 |
| WO | 2017209570 | 12/2017 |
| WO | 2017212104 | 12/2017 |
| WO | 2018021819 | 2/2018 |
| WO | 2018031620 | 2/2018 |
| WO | 2018031770 | 2/2018 |
| WO | 2018032014 | 2/2018 |
| WO | 2018038410 | 3/2018 |
| WO | 2018061572 | 4/2018 |
| WO | 2018062842 | 4/2018 |
| WO | 2018062976 | 4/2018 |
| WO | 2018064582 | 4/2018 |
| WO | 2018084559 | 5/2018 |
| WO | 2018085045 | 5/2018 |
| WO | 2018128200 | 7/2018 |
| WO | 2018130115 | 7/2018 |
| WO | 2018174649 | 9/2018 |
| WO | 2019240887 | 12/2019 |
| WO | 2019240903 | 12/2019 |
| WO | 2019245662 | 12/2019 |
| WO | 2019246429 | 12/2019 |
| WO | 2020033434 | 2/2020 |
| WO | 2020069090 | 4/2020 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.

"3rd Generation Partnership Project; Technical Specification Group Radio Access Network; NG-RAN; Architecture description (Release 15)", 3GPP TS 38.401 V15.0.0, Dec. 2017, 9 Pages.

"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.

"3rd Generation Partnership Project; Technical Specification Group Radio Access Network; NR; Multiplexing and channel coding (Release 15)", 3GPP TS 38.212 V15.2.0, Jun. 2018, 105 pages.

"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.

"3rd Generation Partnership Project; Technical Specification Group Radio Access Network; NR; Physical channels and modulation (Release 15)", 3GPP TS 38.211 V15.2.0, Jun. 2018, 46 pages.

"3rd Generation Partnership Project; Technical Specification Group Radio Access Network; NR; Physical layer procedures for control (Release 15)", 3GPP TS 38.213 V15.2.0, Jun. 2018, 49 pages.

"3rd Generation Partnership Project; Technical Specification Group Radio Access Network; NR; Physical layer procedures for data (Release 15)", 3GPP TS 38.214 V15.2.0, Jun. 2018, 95 pages.

"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.

"3rd Generation Partnership Project; Technical Specification Group Radio Access Network; Study on Integrated Access and Backhaul (Release 15)", 3GPP TR 38.874 V0.2.1, May 2018, 19 Pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"Architecture Description", 3GPP TS 38.401 version 15.2.0 Release 15, Jul. 2018, 40 pages.

"Considerations on Link Rate Adaptation for NOMA", 3GPP TSG RAN WG1 Meeting #93, Busan, Korea, May 2018, 4 pages.

"Considerations on NOMA Procedures", 3GPP TSG RAN WG1 Meeting #93, Busan, Korea, May 2018, 3 pages.

"CU-DU Interface: Overall Categorization of C-Plane and U-Plane", TSG-RAN Working Group 3 meeting #95, Athens, Greece, Feb. 13-17, 2017, Feb. 2017, 9 pages.

"Discussion on Categorization of MA Schemes and Target Scenarios", 3GPP TSG RAN WG1 Meeting #86, Gothenburg, Sweden, Aug. 2016, 3 pages.

(56) References Cited

OTHER PUBLICATIONS

"Discussion on NOMA Procedure", 3GPP TSG RAN WG1 Meeting #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"F1 Interface: Radio Resource Configuration Management", TSG-RAN Working Group 3 meeting #96, Hangzhou, China, May 15-19, 2017, May 2017, 4 pages.
"Final Office Action", U.S. Appl. No. 16/387,000, dated Nov. 24, 2020, 13 pages.
"Final Report of 3GPP TSG RAN WG1 #86bis v1.0.0", Final Report of 3GPP TSG RAN WG1 #86bis v1.0.0, (Lisbon, Portugal), Oct. 2016, 160 pages.
"Final Report of 3GPP TSG RAN WG1 #92bis v1.0.0AN WG1 #92bis v1.0.0", Final Report of 3GPP TSG RAN WG1 #92bis v1.0.0, (Sanya, China), Apr. 2018, 195 pages.
"Grant-Free UL Transmissions in NR", 3GPP TSG-RAN WG1 #86bis, Lisbon, Portugal, Oct. 2016, 8 pages.
"Grant-less and Non-orthogonal UL Transmissions in NR", 3GPP TSG-RAN WG1 #86, Gothenburg, Sweden, Aug. 22-26, 2016, Aug. 2016, 5 pages.
"International Preliminary Reporton Patentability", Application No. PCT/US2019/031059, dated Dec. 22, 2020, 11 pages.
"International Preliminary Reporton Patentability", Application No. PCT/US2019/045346, dated Nov. 13, 2020, 12 pages.
"International Preliminary Reporton Patentability", Application No. PCT/US2019/029691, dated Dec. 15, 2020, 7 pages.
"International Preliminary Reporton Patentability", Application No. PCT/US2019/032285, dated Dec. 15, 2020, 7 pages.
"International Preliminary Reporton Patentability", Application No. PCT/US2019/038295, dated Dec. 22, 2020, 8 pages.
"International Search Report and Written Opinion", PCT Application No. PCT/US2019/029691, dated Jul. 19, 2019, 12 pages.
"International Search Report and Written Opinion", PCT Application No. PCT/US2019/038295, dated Sep. 4, 2019, 14 pages.
"International Search Report and Written Opinion", PCT Application No. PCT/US2019/031059, dated Aug. 19, 2019, 16 pages.
"International Search Report and Written Opinion", PCT Application No. PCT/US2019/045346, dated Oct. 17, 2019, 17 pages.
"International Search Report and Written Opinion", PCT Application No. PCT/US2019/053105, dated Dec. 10, 2019, 17 pages.
"International Search Report and Written Opinion", PCT Application No. PCT/US2019/032285, dated Aug. 14, 2019, 85 pages.
"Key Processing Modules at Transmitter Side for NOMA", 3GPP TSG RAN WG1 Meeting #93, Busan, Korea, May 2018, 11 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"NOMA Related Procedure", 3GPP TSG RAN WG1 Meeting #93, Busan, Korea, May 2018, 8 pages.
"Non-Final Office Action", U.S. Appl. No. 16/387,000, filed Jun. 4, 2020, 10 Pages.
"Non-Final Office Action", U.S. Appl. No. 16/427,712, filed Nov. 4, 2020, 17 pages.
"On Categorization of MA Schemes for NR", 3GPP TSG-RAN WG1 Meeting #86, Gothenburg, Sweden, Aug. 2016, 2 pages.
"Procedures related consideration to NoMA", 3GPP TSG RAN WG1 Meeting #92bis-R1-1804398, Apr. 2018, 6 pages.
"Receivers for NOMA", 3GPP TSG RAN WG1 Meeting #92, Athens, Greece, Feb. 2018, 8 Pages.

"Status Report to TSG", 3GPP TSG RAN meeting #77-RP-172105, Sep. 2017, 4 pages.
"Summary of [86-18] Email Discussion on Categorization for NR MA Schemes", 3GPP TSG RAN WG1 Meeting #86bis, Lisbon, Portugal, Oct. 10-14, 2016, Oct. 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Third Generation Partnership Project; Technical Specification Group Services and System Aspects; Service requirements for the 5G system Stage 1", 3GPP TS 22.261 version 16.10.0 Release 16, Dec. 2019, 72 pages.
"Typical multi-user receivers for NOMA", 3GPP TSG RAN WG1 Meeting #92, Athens, Greece, Feb. 26-Mar. 2, 2018, Feb. 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"WF on UL Multiple Access Scheme Categorization for mMTC", 3GPP TSG RAN WG1 #86, Gothenburg, Sweden, Aug. 2016, 3 pages.
"Written Opinion", PCT Application No. PCT/US2019/045346, dated Jun. 22, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J. "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.
Ye, Neng et al., "Uplink Nonorthogonal Multiple Access Technologies Toward 5G: A Survey", Hindawi Wireless Communications and Mobile Computing vol. 2018, Article ID 6187580, 26 pages, Jun. 12, 2018, 27 pages.
Yuan, Yifei "NOMA Study in 3GPP for 5G", ISTC 2018, Hong Kong, Dec. 2018, 32 pages.
Yuan, Zhifeng et al., "Blind Multi-User Detection for Autonomous Grant-Free High-Overloading MA Without Reference Signal", ZTE Corporation, South Keji Road, 55, Shenzhen, China, 508118, Dec. 7, 2017, 13 pages.
Georgakopoulos, et al., "Preliminary results on multi-antenna access and link enhancements", Jun. 1, 2017, 120 pages.
"International Preliminary Report on Patentability", Application No. PCT/US2019/053105, dated Apr. 8, 2021, 9 pages.
"Notice of Allowance", U.S. Appl. No. 16/387,000, dated Mar. 31, 2021, 8 pages.
"Extended European Search Report", EP Application No. 22159471.6, dated May 24, 2022, 9 pages.
"Notice of Allowance", U.S. Appl. No. 17/042,792, filed Apr. 12, 2022, 12 pages.
"Notice of Allowance", U.S. Appl. No. 17/059,131, filed May 12, 2022, 11 pages.

* cited by examiner

NON-ORTHOGONAL MULTIPLE ACCESS CONFIGURATION IN SPLIT BASE STATION ARCHITECTURES

CROSS-REFERENCE TO RELATED APPLICATIONS

This application is a National Stage entry of International Application No. PCT/US2019/053105, filed Sep. 28, 2019, which claims the benefit of U.S. Provisional Application No. 62/737,025, filed Sep. 26, 2018, the disclosures of which are incorporated by reference.

BACKGROUND

The evolution of wireless communication to Fifth Generation (5G) standards and technologies provides higher data rates and greater capacity, with improved reliability and lower latency, which enhances mobile broadband services. 5G technologies also provide new classes of services for vehicular, fixed wireless broadband, and the Internet-of-Things (IoT). To support these new classes of services, 5G New Radio (5G NR) can be used for access to 3rd Generation Partnership Project (3GPP) 5G Next Generation NodeB (gNB) base stations that support 5G NR, as well as for wireless backhaul of traffic from and to 3GPP 5G gNB base stations that support 5G NR.

Non-Orthogonal Multiple Access (NOMA) is a multiplexing technique utilized by wireless networks (e.g., 5G wireless networks) to allow multiple terminals (e.g., user equipment) to transmit signals in the same time and frequency resource. NOMA is accomplished by spreading signals onto a larger and shared resource grid at a bit and symbol level, where the shared resource grid corresponds to one or more of a frequency domain, a time domain, a code domain, or a spatial domain. In 5G NR, a gNB base station can include a Central Unit (CU) and at least one Distributed Unit (DU). The current 3GPP specification is unclear on the gNB-CU setup of a corresponding radio resource control (RRC) configuration when a gNB-DU decides to configure a user equipment (UE) for NOMA transmission.

SUMMARY

This summary introduces simplified concepts of NOMA configuration procedures in split base station architectures. The following Detailed Description further describes these simplified concepts. This Summary is not provided for the purpose of identifying essential features of the claimed subject matter, nor is this Summary intended for use in determining the scope of the claimed subject matter.

This disclosure describes techniques and apparatuses for NOMA configuration procedures in split base station architectures. These techniques and apparatuses enable base stations to configure user equipment for NOMA transmission more efficiently. As a result, there is a reduction in the frequency of transmissions sent and/or received by the user equipment and the network, thereby decreasing power expended by the user equipment and the network in processing and handling such information, increasing the battery life of the user equipment, and freeing up network resources.

Aspects described below include a method for configuration of user equipment for non-orthogonal multiple access transmission by a base station. In this method, the base station receives a first trigger relating to a first user equipment. The base station generates a non-orthogonal multiple access configuration including a plurality of multiple access signatures and transmission occasions information for non-orthogonal multiple access transmission. The base station, responsive to detecting the first trigger, configures the first user equipment to perform non-orthogonal multiple access transmission. In one example implementation, the Central Unit of the base station transmits a message including the non-orthogonal multiple access configuration to a Distributed Unit of the base station and then transmits another message including the non-orthogonal multiple access configuration to the first user equipment. In a second example implementation, the Central Unit transmits a message including the non-orthogonal multiple access configuration to the first user equipment. In a third example implementation, the Distributed Unit transmits a message including the non-orthogonal multiple access configuration to the Central Unit and then transmits another message including the non-orthogonal multiple access configuration to the first user equipment.

Aspects described below also include a method for configuring and communicating with at least one UE by a gNB base station having a gNB Central Unit (gNB-CU) and a gNB Distributed Unit (gNB-DU). The method includes the gNB receiving a first trigger relating to a first UE. The first trigger can include at least one of a message received on behalf of the first UE, an uplink transmission received from the first UE, or an indication of at least one service condition of the first UE. In response to the first trigger, the gNB sets up a corresponding RRC configuration configuring the first UE to perform NOMA transmission by the gNB-CU transmitting a NOMA configuration to the gNB-DU and the gNB-DU transmitting the NOMA configuration to the first UE in an RRC message.

Aspects described below also include a method of configuring and communicating with at least one UE by a gNB-CU and a gNB-DU of a gNB. The method includes the gNB receiving a first trigger relating to a first UE. The first trigger may include at least one of a message received on behalf of the first UE, an uplink transmission received from the first UE, or an indication of at least one service condition of the first UE. In response to the first trigger, the gNB sets up a corresponding RRC configuration configuring the first UE to perform NOMA transmission by the gNB-DU transmitting a NOMA configuration to the first UE and the gNB-DU transmitting a UE context modification required message including the NOMA configuration to the gNB-CU.

BRIEF DESCRIPTION OF THE DRAWINGS

This specification describes apparatuses for and techniques of NOMA configuration procedures in split base station architectures with reference to the following drawings. The same numbers are used throughout the drawings to reference like features and components.

DETAILED DESCRIPTION

Overview

This document describes techniques and apparatuses for NOMA configuration procedures in split base station architectures. While any number of different environments, methods, systems, devices, and/or various configurations can implement features and concepts of the described techniques and apparatuses for NOMA configuration procedures in split base station architectures, aspects for the handling of NOMA configuration procedures in split base station architectures are described in the context of the following example environments, devices, systems, methods, and configurations.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Example Environments

Figure 1:
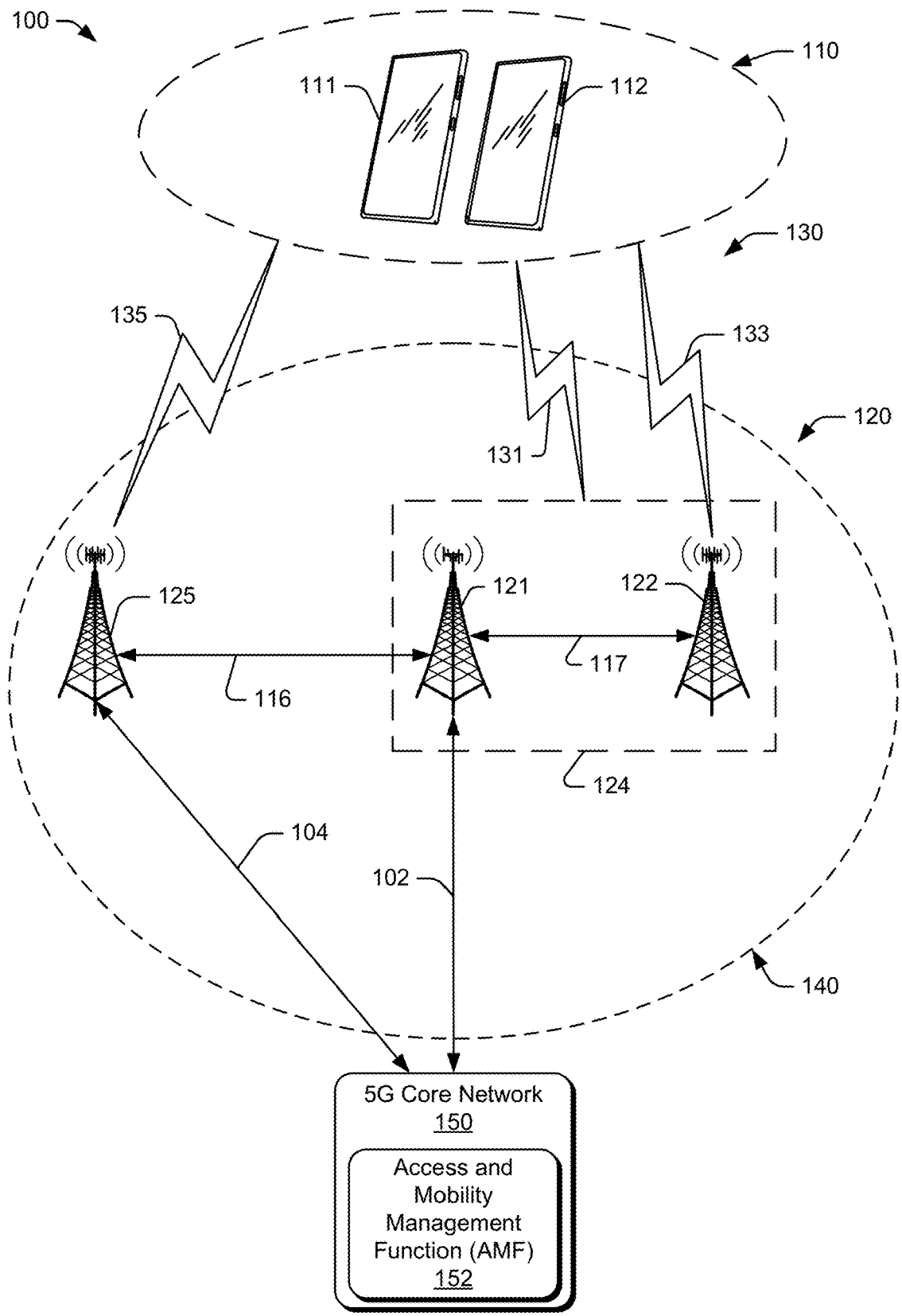
FIG. 1 illustrates an example wireless network environment that may implement various aspects of NOMA configuration procedures in split base station architectures.

FIG. 1 illustrates an example environment 100, which includes multiple user equipment (UE) 110, illustrated as UE 111 and UE 112. Each UE 110 can communicate with one or more base stations 120 (illustrated as base station 121, base station 122, and base station 125). One or more of the base stations 120 can function as a serving cell (serving base station 120) through one or more wireless communication links 130 (wireless links 130), illustrated as wireless link 131, wireless link 133, and wireless link 135. For simplicity, FIG. 1 illustrates the UE 110 as a smartphone, but may be implemented as any suitable computing or electronic device, such as a mobile communication device, a modem, cellular phone, gaming device, navigation device, media device, laptop computer, desktop computer, tablet computer, smart appliance, vehicle-based communication system, or an IoT device such as a sensor or an actuator.

The base stations 120 (e.g., an Evolved Universal Terrestrial Radio Access Network Node B, E-UTRAN Node B, evolved Node B, eNodeB, eNB, Next Generation Node B, gNode B, gNB, ng-eNB) may be implemented in a macrocell, microcell, small cell, picocell, or the like, or any combination thereof.

The base stations 120 communicate with the UE 110 using the wireless links 130, which may be implemented as any suitable type of wireless link. The wireless links 130 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3GPP Long-Term Evolution (3GPP LTE), 5G NR, and so forth.

In general, one of the UE 110 communicates with a base station 120 through a wireless link 130. In FIG. 1, the base station 120 is a Next Generation Node B base station 124 (gNB 124). A gNB base station may include a gNB Central Unit (gNB-CU) base station and one or more gNB Distributed Unit (gNB-DU) base stations. In a typical implementation, one gNB-DU connects to only one gNB-CU. However, for resiliency, a gNB-DU may connect to multiple gNB-CU by an appropriate implementation. A gNB-CU is a logical node hosting the Radio Resource Control (RRC) and Packet Data Convergence Protocol (PDCP) protocols of the gNB. A gNB-DU is a logical node hosting the Radio Link Control (RLC), Medium Access Control (MAC), and the Physical (PHY) layers of the gNB. The gNB-CU partially controls the operation of the gNB-DU. The gNB-CU may be a logical unit with no physical unit (e.g., baseband processing unit, RF train, antenna). A gNB-DU supports one or multiple cells, and a cell is supported by only one gNB-DU.

In FIG. 1, the gNB 124 includes gNB-CU 121 and gNB-DU 122. The gNB-CU 121 connects using a F1 interface 117 to gNB-DU 122. The use of "F1 interface" (F1) refers to a logical interface that connects a gNB-CU and a gNB-DU. The gNB-CU 121 terminates the F1 interface connected with the gNB-DU 122 and the gNB-DU 122 terminates the F1 interface connected with the gNB-CU 121. The F1 interface specifications facilitate the interconnection of a gNB-CU and a gNB-DU supplied by different manufacturers. The F1 interface, along with the NG interface and the Xn interface described later, are logical interfaces described by the technical specifications for New Radio and related specifications. The F1 Application Protocol (F1AP) supports the function of the F1 interface.

As illustrated in FIG. 1, the user equipment 110 may communicate with gNB-DU 122 through wireless link 133. The wireless link 133 may be implemented using the same communication protocol or communication standard, or a different communication protocol or communication standard, as the other wireless links 130. The user equipment 110 may communicate indirectly with gNB-CU 121 through wireless link 133 to gNB-DU 122 and the F1 interface 117. The F1AP interface provides a "container" for a gNB-CU to send indirectly an RRC message to the UE, forwarded by gNB-DU. The gNB-DU will not open the container to read or check the message inside. In other words, the gNB-CU configures the UE context for both gNB-DU and UE individually, afterwards they communicate with each other according to the UE context provided.

In aspects, the user equipment 110 may communicate with another base station (neighbor base station 125) through wireless link 135. The wireless link 135 may be implemented using the same communication protocol or communication standard, or a different communication protocol or communication standard, as wireless link 131 and/or wireless link 133. The neighbor base station 125 may be a gNB base station (gNB 125).

The base stations 120 collectively form a Radio Access Network 140 (e.g., RAN 140, Evolved Universal Terrestrial Radio Access Network, E-UTRAN, 5G NR RAN, NR RAN). The base stations 124 and 125 in the RAN 140 are connected using links (e.g., NG interface 102, NG interface 104) to a Fifth Generation Core Network 150 (5GC 150) to form a wireless operator network. For example, base station 124 (through gNB-CU 121) and base station 125 connect, at NG interface 102 and NG interface 104 respectively, to the 5GC 150 through an NG2 interface for control-plane signaling and an NG3 interface for user-plane data communications. In addition to connections to core networks, the base stations 120 may communicate with each other. The gNB 124 (e.g., gNB-CU 121) and gNB 125 communicate using an Xn Application Protocol (XnAP) through an Xn interface 116 to exchange user-plane and control-plane data. The 5GC 150 includes an Access and Mobility Management Function 152 (AMF 152), which provides control-plane functions such as registration and authentication of multiple UE 110, authorization, and mobility management in the 5G NR network. The AMF 152 communicates with the base stations 120 in the RAN 140. The AMF 152 also communicates indirectly with multiple UE 110, using the base stations 120.

Example Devices

Figure 2:
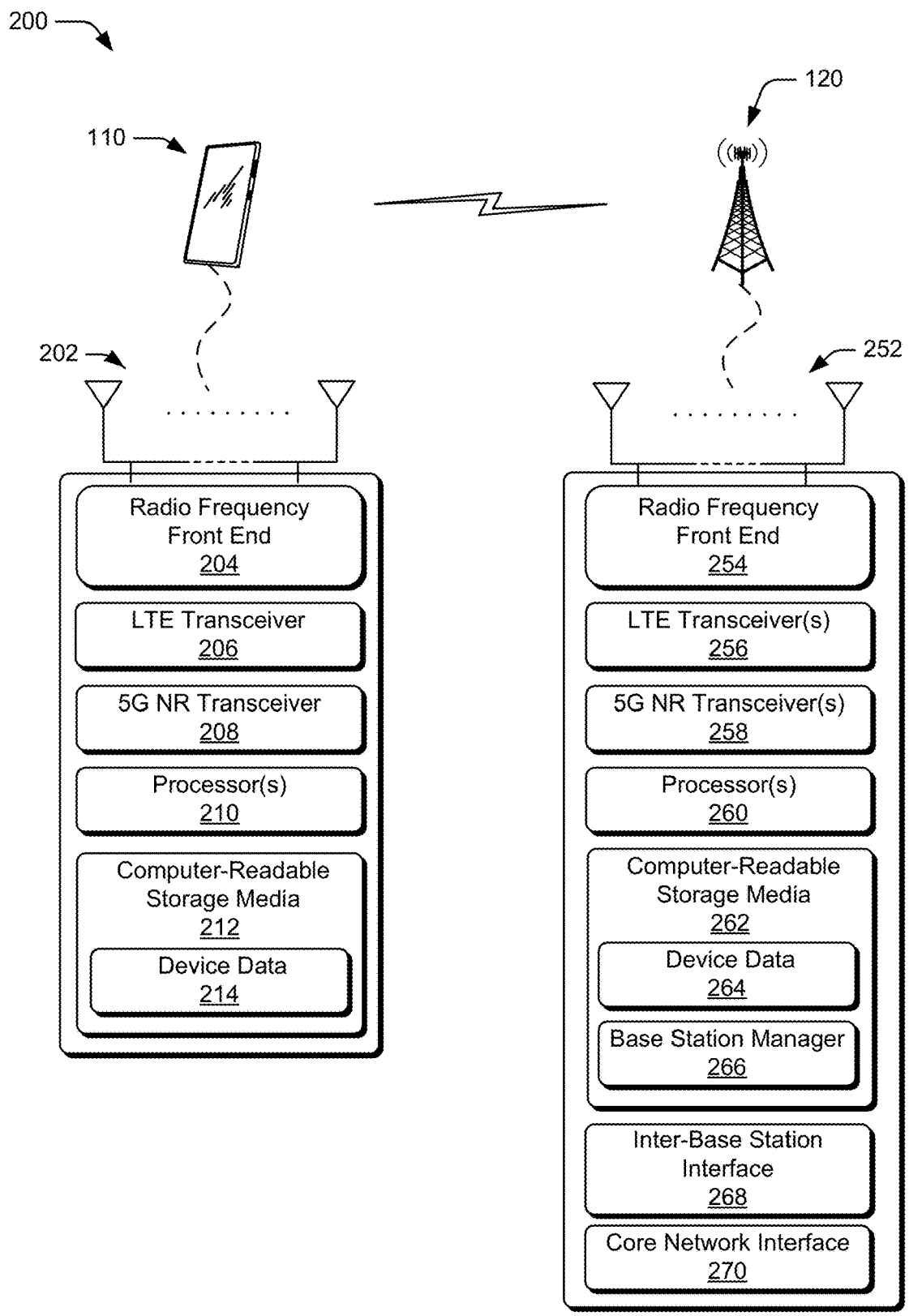
FIG. 2 illustrates an example device diagram that can implement various aspects of NOMA configuration procedures in split base station architectures.

FIG. 2 illustrates an example device diagram 200 of the UE 110 and the base station 120. The UE 110 and the base station 120 may include additional functions and interfaces omitted from FIG. 2 for the sake of clarity. The UE 110 includes antennas 202, a radio frequency front end 204 (RF front end 204), an LTE transceiver 206, and a 5G NR transceiver 208 for communicating with one or more base stations 120 in the 5G RAN 140. The RF front end 204 of the UE 110 can couple or connect the LTE transceiver 206 and the 5G NR transceiver 208 to the antennas 202 to facilitate various types of wireless communication. The antennas 202 of the UE 110 may include an array of multiple antennas configured similar to or different from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, one or more of the antennas 202, the RF front end 204, the LTE transceiver 206, or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes one or more processor(s) 210 and computer-readable storage media 212 (CRM 212). A processor 210 may be a single-core processor or a multiple-core processor composed of a variety of materials (e.g., silicon, polysilicon, high-K dielectric, copper). The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor(s) 210 to enable user-plane communication, control-plane signaling, and user interaction with the UE 110.

The device diagram for the base stations 120, illustrated in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256 and/or one or more 5G NR transceivers 258 for communicating with the UE 110. The RF front end 254 of the base stations 120 can couple or connect the LTE transceiver(s) 256 and the 5G NR transceiver(s) 258 to the antennas 252 to facilitate various types of wireless communication. The antennas 252 of the base stations 120 may include an array of multiple antennas configured similar to or different from each other. The antennas 252 and the RF front end 254 can be tuned to, and/or be tunable to, one or more frequency band defined by the 3GPP LTE and 5G NR communication standards, and implemented by the LTE transceiver(s) 256, and/or the 5G NR transceiver(s) 258. Additionally, the antennas 252, the RF front end 254, the LTE transceiver(s) 256, and/or the 5G NR transceiver(s) 258 may be configured to support beamforming, such as Massive-MIMO, for the transmission and reception of communications with the UE 110.

The base stations 120 also include one or more processor(s) 260 and computer-readable storage media 262 (CRM 262). A processor 260 may be a single-core processor or a multiple-core processor composed of a variety of materials (e.g., silicon, polysilicon, high-K dielectric, copper). CRM 262 may include any suitable memory or storage device such as RAM, SRAM, DRAM, NVRAM, ROM, or Flash memory useable to store device data 264 of the base stations 120. The device data 264 includes network scheduling data, radio resource management data, beamforming codebooks, applications, and/or an operating system of the base stations 120, which are executable by the processor(s) 260 to enable communication with the UE 110.

CRM 262 also includes a base station manager 266. Alternatively or additionally, the base station manager 266 may be implemented in whole or part as hardware logic or circuitry integrated with or separate from other components of the base stations 120. In at least some aspects, the base station manager 266 configures the LTE transceiver(s) 256 and the 5G NR transceiver(s) 258 for communication with the UE 110, as well as communication with a core network. The base stations 120 include an inter-base station interface 268, such as an Xn, an X2, and/or an F1 interface, which the base station manager 266 configures to exchange user-plane and control-plane data with another base station 120 and to manage the communication of the base stations 120 with the UE 110. The base stations 120 include a core network interface 270 that the base station manager 266 configures to exchange user-plane and control-plane data with core network functions and entities.

Non-Orthogonal Multiple Access

In Non-Orthogonal Multiple Access (NOMA), the UE can be configured, through NOMA configurations, to transmit signals (e.g., uplink transmissions) on the same resource with additional signal processing, referred to as multiple access (MA) signatures. NOMA spreads signals onto a larger and shared resource grid at a bit and symbol level, where the shared resource grid corresponds to one or more of a frequency domain, a time domain, a code domain, or a spatial domain. By applying multiple-user detection in the base station and an MA signature in the UE, overall system throughput is increased.

An MA signature can be based on one or more of bit-level and symbol-level signal processing, such as spreading, repetition, scrambling, sparse resource mapping, and forward error control (FEC) coding. A NOMA configuration may include one, one set, or multiple sets of MA signatures and transmission occasions information for NOMA transmission. The transmission occasions information may include one or more time and frequency resources indications. If a base station configures multiple MA signatures to a UE, the UE can select one or more MA signatures, and then transmit signals in parallel, serial, or in hybrid ways. In aspects, an MA signature can be utilized in any suitable signal processing scheme, such as a combination of bit-level scrambling, bit-level interleaving, symbol-level spreading, symbol-level scrambling, symbol-level interleaving with no zero padding, power assignment, sparse Resource Element (RE) mapping, and/or multiplexing with a preamble. Through multiplexing with a preamble, a preamble can be associated with an uplink transmission.

The signal processing of a UE building a signal base on the received NOMA configuration may include: the UE spreading information bits (e.g., containing data or Medium Access Control (MAC) Protocol Data Unit (PDU)) by the configured channel coding; the UE scrambling a code block or a transport block according to the configured scrambles sequence; the UE interleaving a code block or a transport block according to the configured interleaving pattern; the UE spreading the modulated symbols with the configured spreading sequence; the UE scrambling the modulated symbols with the configured spreading sequence; the UE interleaving the modulated symbols with the configured interleaving pattern with no zero padding; the UE allocating the modulated symbols according to the configured sparse RE pattern; the UE amplifying the power of modulated symbols according the configuration; the UE transmitting the signal with a configured preamble; and/or any combination thereof.

Multi-Branch Transmission/Parallel Transmission

An example NOMA application is multi-branch transmission in which a UE can transmit multiple signals with different MA signatures in parallel (NOMA parallel transmission). NOMA parallel transmission provides an additional dimension among time, frequency, and spatial dimensions. NOMA schemes have been proposed that utilize multi-branch (multi-layer) transmission, including multi-layer operation modes for symbol-level spreading schemes via linear superposition. Examples of such NOMA schemes include utilizing multi-layer transmission before forward error control (FEC) and utilizing multi-layer transmission after modulation. In multi-layer (multi-branch) transmission, a UE can transmit multiple signals with different MA signatures in parallel simultaneously. This technique provides an additional dimension among time, frequency, and spatial dimensions. Multi-layer linear superposition per user can be considered in order to achieve high per-user spectral efficiency. This multi-layer processing can be common to multi-layer operation modes for symbol-level spreading schemes via linear superposition, where UE-specific MA signature could be replaced by layer-specific MA signature if multi-layer transmission is applied, and the layer-specific MA signatures can be either orthogonal or non-orthogonal.

For the multi-layer splitting at the bit-level, each layer's data is individually encoded. Minimum mean squared error (MMSE) can be applied with hard successive interference cancellation (hard-SIC) at the receiver where each layer's data is decoded one-by-one. Additional Cyclical Redundancy Check (CRC) overhead may be required for the hard interference cancellation and reconstruction of each layer's data, which may result in some performance loss due to the higher coding rate.

For the multi-layer splitting at the symbol-level, each layer's data share the same FEC and modulation, and there is no need of additional CRC overhead compared with the above-described multi-layer splitting at the bit-level mode. However, interference of each layer's data cannot be fully canceled with hard-SIC since the CRC check can only be performed after the combination of each user's data from the multiple layers. In this case, soft parallel interference cancellation (PIC) may be implemented to reduce the inter-layer interferences.

Multiple-User Detection

Multiple-user detection (MUD) is a major task performed by receivers for NOMA. A multiple-user detection receiver (a MUD receiver) can be implemented in numerous ways. For instance, a MUD receiver can include an estimator and some of the estimator alongside with an outer iterative algorithm. In other instances, the estimator can be at least one of a bit-level estimator or a symbol-level estimator. The bit-level estimators of a MUD receiver can use algorithms (e.g., Message Passing Algorithm (MPA), Estimation Propagation Algorithm (EPA), Belief Propagation (BP)). Algorithms like MPA and BP can achieve MUD without an outer iterative algorithm. The symbol-level estimators of a MUD receiver can include Matched Filter (MF), Elementary Signal Estimator (ESE), and Linear Minimum Mean Square Error (LMMSE) estimator. MPA, EPA, and BP estimators can jointly cancel the interference, and ESE can suppress the interference by iteratively updating the log-likelihood-ratio (LLR) of the bit stream that has not successively decoded, namely SIC.

Some conventional estimators such as LMMSE cannot achieve MUD by itself. However, with SIC as the outer iterative algorithm, the LMMSE+SIC combination can achieve MUD. Estimators, such as MF and LMMSE, adopt the outer iterative algorithm for interference cancellation. Examples of outer iterative algorithms include SIC, PIC, and Hybrid Interference Cancellation (HIC). For example, a multiple-user detector with SIC algorithm will first try to detect the strongest signal in the composite signal and treat the remaining signal as interference. When the MUD receiver successfully detects the strongest signal, the MUD receiver can reconstruct the signal and eliminate the signal from the composite signal. By iteratively repeating the detection, reconstruction, and elimination process, the MUD receiver can distinguish the individual signal from the composite signal.

An example MUD receiver implements a classical Linear Minimum Mean Square Error estimator (LMMSE) with Successive Interference Cancellation (SIC) procedure, where the estimator attempts to decode the signals of a user equipment k with highest signal to noise plus interference ratio (SINR), if the decoded signals pass the Cyclic Redundancy Check (CRC) the estimator will encode, reconstruct, and remove the decoded signals from the received signals, and then the estimator will decode the next UE's signals. If the decoded signals do not pass the CRC, then the estimator will abort the LMMSE-SIC procedure.

Another example MUD receiver implements a procedure for enhanced LMMSE-SIC, where (in comparison to a classical LMMSE-SIC procedure), for decoded signals that do not pass the CRC, signals with lower SINR still have a chance to decode successfully. In this procedure, the estimator attempts to decode the signals of a user equipment k with highest signal to noise plus interference ratio (SINR), if the decoded signals pass the CRC the estimator will encode, reconstruct, and remove the decoded signals from the received signals, and then the estimator will decode the next UE's signals. If the decoded signals do not pass the CRC, signals with lower SINR still have a chance to decode successfully, thus an enhanced LMMSE-SIC will try to detect other UEs while the UE with highest SINR fails to pass the CRC.

Next Generation Node B Base Station RRC-Related Functions

In 5G NR, a gNB base station includes a Central Unit (CU) and at least one Distributed Unit (DU). A number of functional splits between CU and DU have been proposed for incorporation into the current specification. As described above, in the current architecture, the function of the protocol stack in gNB has been split, with the gNB-CU hosting the RRC and PDCP protocols of the gNB and the gNB-DU hosting the RLC, MAC, and PHY layers of the gNB; whereas the UE has a full protocol stack. As a result, the RRC configuration is hosted by the gNB-CU, and only the gNB-CU can configure a UE by RRC messaging. Thus, if a gNB-DU is triggered to configure a UE to perform NOMA transmission, because in the current specification RRC configuration is hosted by the gNB-CU, the gNB-DU first needs the gNB-CU to configure the UE for NOMA transmission by setting up a corresponding RRC configuration. The procedure for the gNB-CU to set up the corresponding RRC configuration is not clear in the existing protocol.

RRC-Assisted NOMA Configuration Procedures for gNB-CU

FIGS. 3-6 illustrate example methodologies 300, 400, 500, and 600 for RRC-Assisted NOMA configurations where the base station is a gNB including a gNB-CU and at least one gNB-DU, and a trigger results in the gNB-CU configuring the UE to transmit in NOMA. In FIGS. 3-6, the gNB-CU 121 is the Central Unit of a gNB (e.g., gNB 124 illustrated in FIG. 1) connected with at least one Distributed Unit (e.g., gNB-DU 122). The gNB 124 is also in communication with at least one UE 110.

Figure 3:
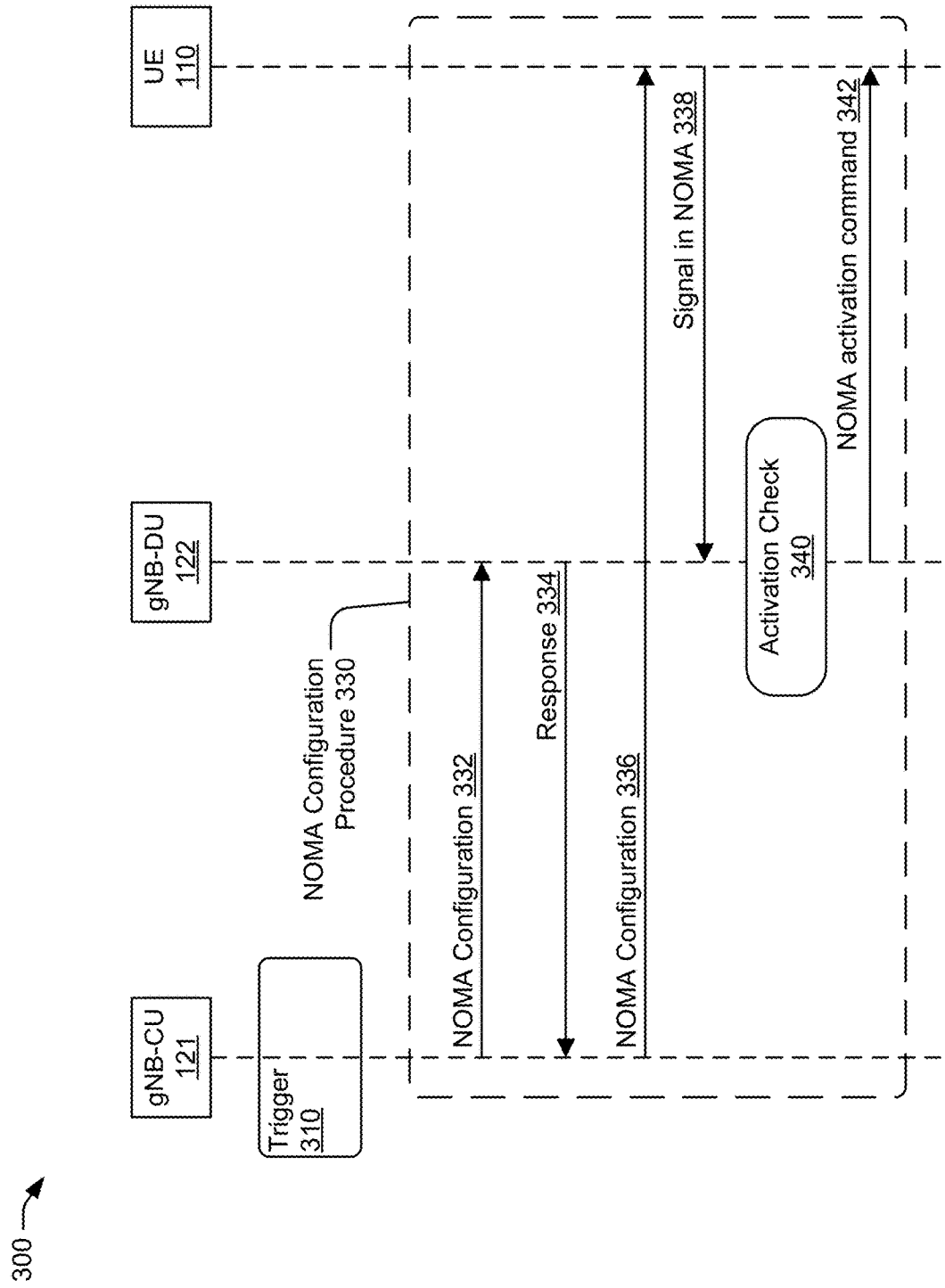
FIG. 3 is a sequence diagram illustration of RRC-assisted NOMA configuration procedures for gNB-CU.

In the methodology 300 for RRC-Assisted NOMA configuration of FIG. 3, in response to a trigger 310, the gNB-CU 121 may initiate a NOMA configuration procedure 330 to set up a corresponding RRC configuration configuring the UE 110 to perform NOMA transmission. In some cases, the trigger 310 can relate to at least one of a message received indirectly from (e.g., on behalf of) a UE 110, uplink transmissions received directly from a UE 110, or an indication of at least one service condition (e.g., a capability of the UE 110, a quality of service profile (QoS profile) of the UE 110, the Protocol Data Unit (PDU) Session Information of the UE 110).

In the NOMA configuration procedure 330, the gNB generates a NOMA configuration for configuring the UE 110 to perform NOMA transmission and the gNB-CU 121 may transmit a NOMA configuration message 332 (e.g., an F1AP message), including the NOMA configuration, to the gNB-DU 122 using the F1 interface (e.g., F1 interface 117 of FIG. 1). The NOMA configuration may include one or more MA signatures and transmission occasions information for NOMA transmission. The MA signatures may be in one or more sets of MA signatures.

In response to receiving the NOMA configuration message 332 from the gNB-CU 121, the gNB-DU 122 may transmit a response message 334 (e.g., an F1AP message) to the gNB-CU 121. The NOMA configuration message 332 may be a UE context setup request message including a NOMA configuration, and the response message 334 may be a UE context setup request message. The NOMA configuration message 332 may be a UE context modification request message including a NOMA configuration, and the response message 334 may be a UE context modification response message.

In the NOMA configuration procedure 330, after transmitting the NOMA configuration message 332 including a NOMA configuration to the gNB-DU 122, the gNB-CU 121 may send the NOMA configuration to the UE 110 in an RRC message (e.g., NOMA configuration message 336). In response to receiving the NOMA configuration message 336 including the NOMA configuration, the UE 110 configures itself for NOMA transmission and may send a signal in NOMA 338 to the gNB-DU 122.

The gNB-DU 122 may perform an activation check 340 to determine if receipt of the NOMA configuration in the NOMA configuration message 336 triggered the UE 110 to activate NOMA transmission. The activation check 340 may be utilized to check for a NOMA transmission (e.g., receipt of a signal in NOMA 338) from the UE 110. If, through the activation check 340, the gNB-DU 122 determines that the UE 110 has not activated NOMA transmission, then the gNB-DU 122 may transmit a NOMA activation command message 342 to the UE 110 to activate NOMA transmission on the UE 110. In some cases, the NOMA activation command message 342 may be Downlink Control Information (DCI) and/or a Media Access Control-Control Element (MAC CE).

Figure 4:
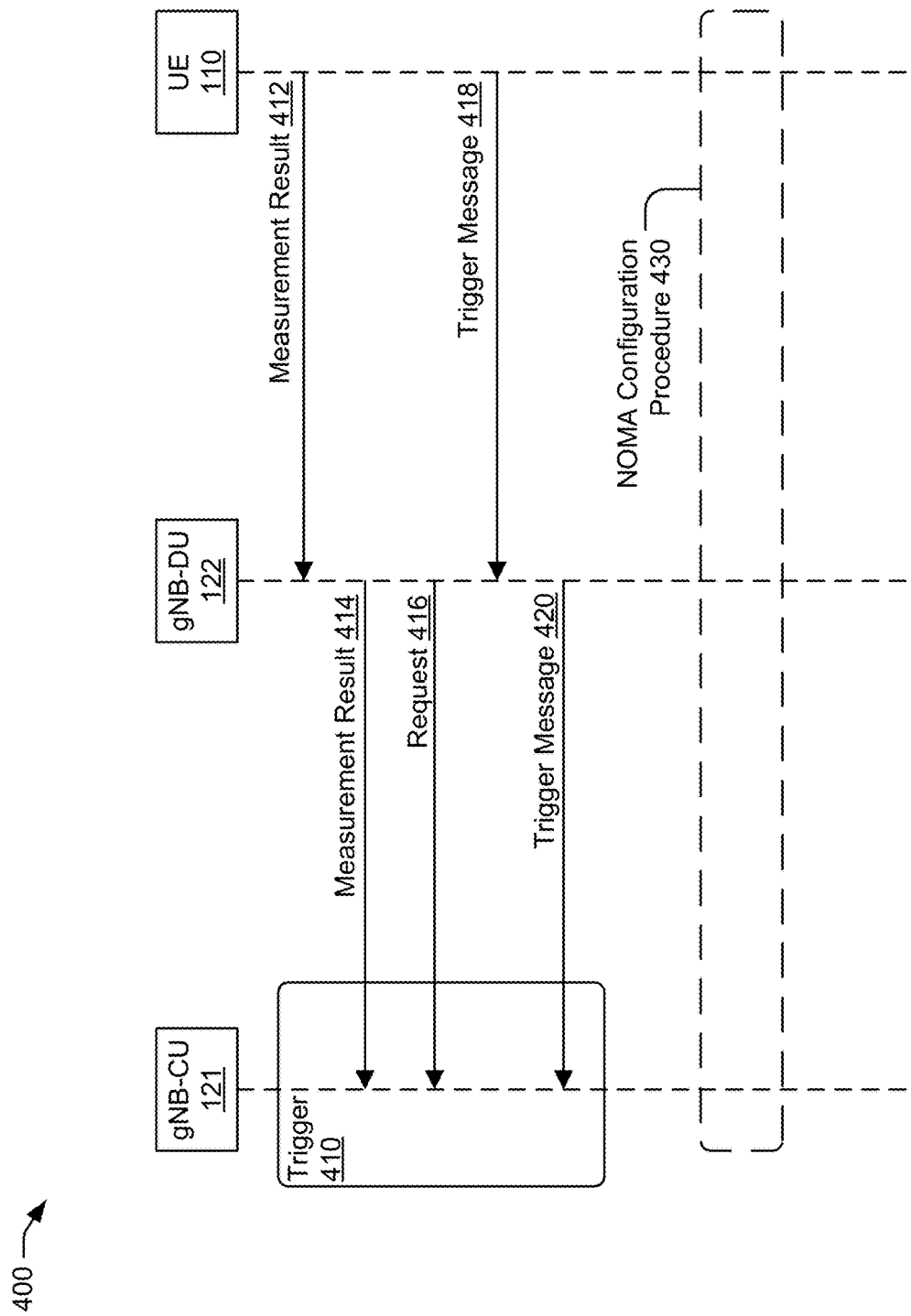
FIG. 4 is a sequence diagram illustration of RRC-assisted NOMA configuration procedures for gNB-CU.
Figure 5:
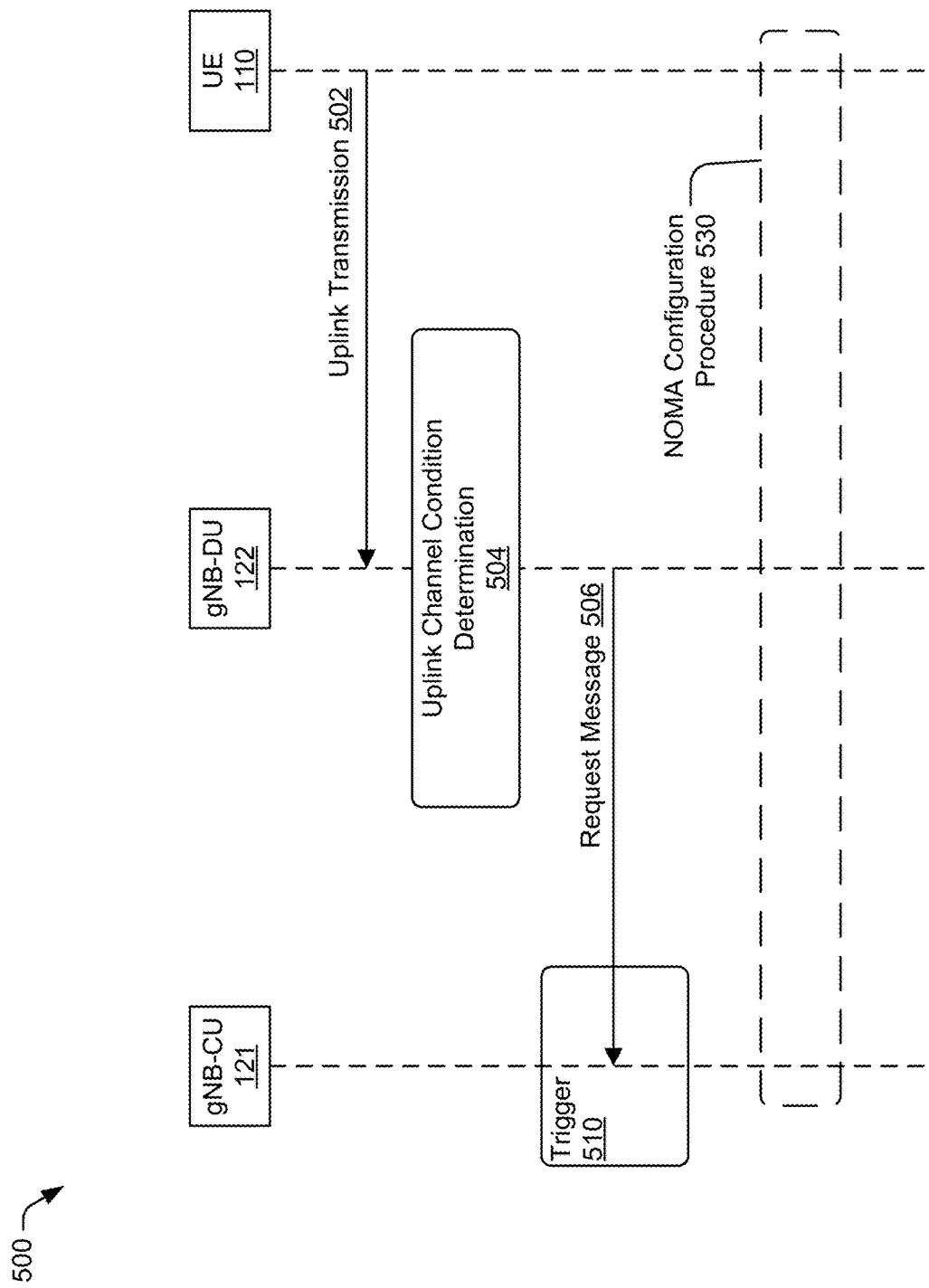
FIG. 5 is a sequence diagram illustration of RRC-assisted NOMA configuration procedures for gNB-CU.

FIG. 4 demonstrates several example triggers for the gNB-CU 121 to initiate NOMA configuration. In the example methodology for RRC-Assisted NOMA configuration 400 of FIG. 4, in response to a trigger 410, the gNB-CU 121 may initiate a NOMA configuration procedure 430 configuring the UE 110 to perform NOMA transmission. In a method 400 for RRC-Assisted NOMA configuration, the UE 110 may send an RRC message, for example, a measurement result message 412, to the gNB-DU 122. The measurement result message 412 may carry one or more measurement report from the UE 110. Responsive to receiving the RRC message (e.g., measurement result message 412) from the UE 110, the gNB-DU 122 may send one or more F1AP messages (e.g., measurement result messages 414) using the F1 interface 117 (illustrated in FIG. 1) to the gNB-CU 121. A measurement result message 414 may carry one or more measurement reports or other information from the UE 110. The trigger 410 may be the receipt by the gNB-CU 121 of a measurement result message 414. The measurement result message 414 may include one or more measurement reports received from the UE 110 in one or more measurement result messages 412. In response to receiving the measurement result message 414 from the gNB-DU 122, the gNB-CU 121 may initiate a NOMA configuration procedure 430 to set up a corresponding RRC configuration configuring the UE 110 to perform NOMA transmission, as described regarding the NOMA configuration procedure 330 in FIG. 3.

In another aspect, the trigger 410 may be the receipt by the gNB-CU 121 of a request message 416 from the gNB-DU 122, the request message 416 requesting (e.g., indicating, directing) configuration of the UE 110 to perform NOMA transmission. The gNB-DU 122 may send the request message 416 to the gNB-CU 121 using the F1 interface 117. In a further aspect, the trigger 410 may be a trigger message 418 from the UE 110 to the gNB-DU 122 that is forwarded to the gNB-CU 121 in a trigger message 420 (e.g., an F1AP message) through the F1 interface 117 between the gNB-DU 122 and the gNB-CU 121.

In some situations, a request message 416 from a gNB-DU may be instigated by uplink transmissions from a UE 110. In the example methodology 500 for RRC-Assisted NOMA configuration of FIG. 5, in response to a trigger 510, the gNB-CU 121 may initiate a NOMA configuration procedure 530 configuring the UE 110 to perform NOMA transmission. The trigger 510 may be a request message 506 sent by the gNB-DU 122 to the gNB-CU 121 in response to the gNB-CU 121 receiving one or more uplink transmissions 502 from the UE 110. Uplink transmissions 502 from multiple UE 110 may be scheduled with the same physical uplink shared channel (PUSCH) resource. The one or more uplink transmissions 502 may include at least one of sounding reference signal (SRS) transmissions, physical uplink control channel (PUCCH) transmissions, or PUSCH transmissions. The request message 506 may be an F1AP message sent using the F1 interface 117 between the gNB-DU 122 and the gNB-CU 121 requesting (e.g., indicating, directing) configuration of the UE 110 to perform NOMA transmission.

In response to receiving the one or more uplink transmissions 502 from the UE 110, the gNB-DU 122 may perform an uplink channel condition determination 504 determining if the UE 110 has an acceptable (e.g., above a static or dynamic threshold) uplink channel condition according to the one or more uplink transmissions 502. If the gNB-DU 122 determines that the UE 110 has an acceptable uplink channel condition, then the gNB-DU 122 may transmit a request message 506 to the gNB-CU 121 requesting (e.g., indicating, directing) configuration of the UE 110 to perform NOMA transmission, for instance using the F1 interface 117. In response to receipt of the request message 506 from the gNB-DU 122, the gNB-CU 121 may initiate the NOMA configuration procedure 530, as described regarding the NOMA configuration procedure 330 in FIG. 3.

Figure 6:
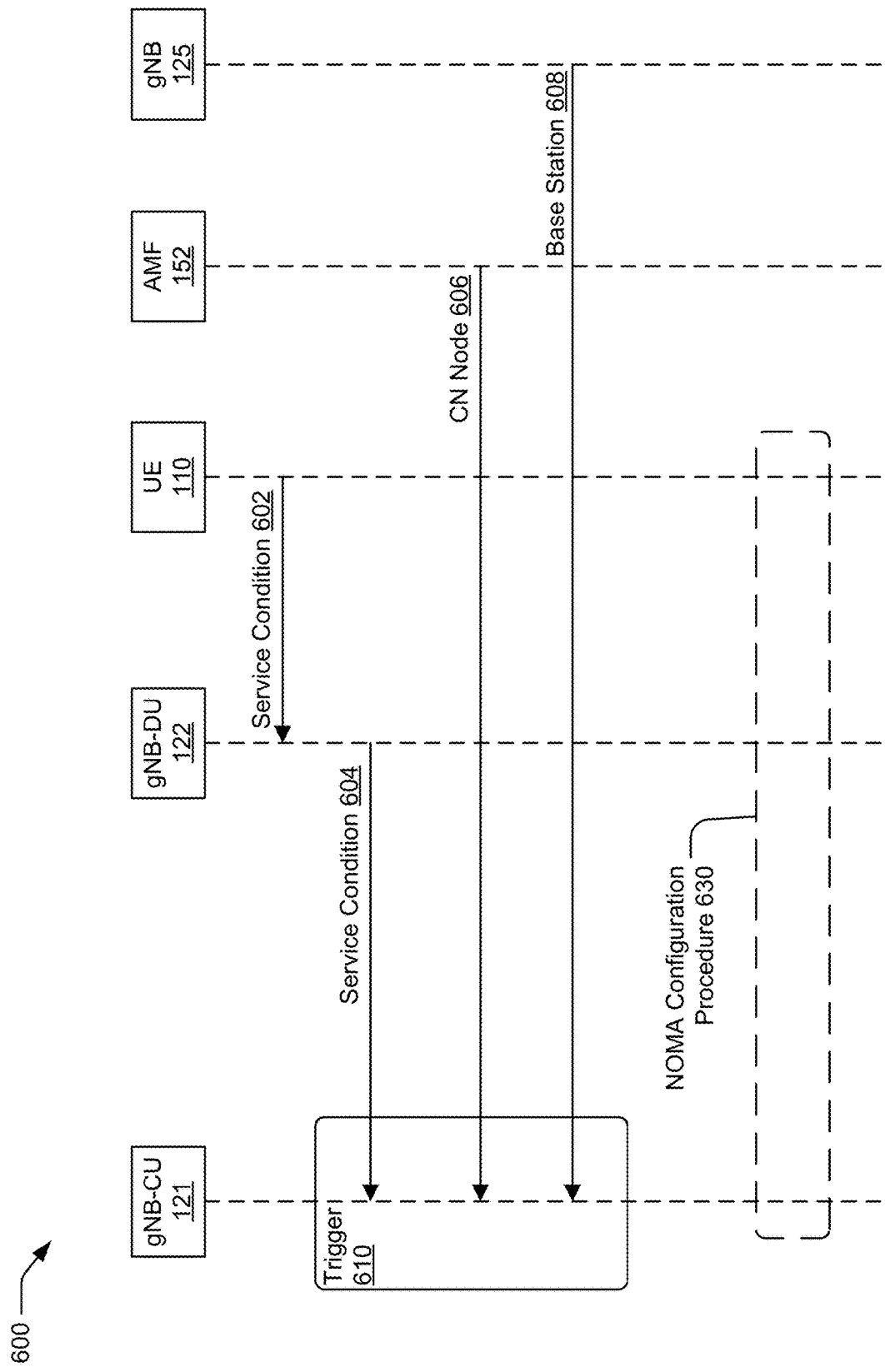
FIG. 6 is a sequence diagram illustration of RRC-assisted NOMA configuration procedures for gNB-CU.

In the example methodology 600 for RRC-Assisted NOMA configuration of FIG. 6, in response to a trigger 610, the gNB-CU 121 may initiate a NOMA configuration procedure 630 configuring the UE 110 to perform NOMA transmission. The trigger 610 may be the gNB-CU 121 receiving an indication of at least one service condition of the UE 110. The service condition may specify a service that the UE 110 is currently using, a service that the UE 110 is currently using and its QoS parameters, a service that the UE 110 is capable of supporting (e.g., that the UE 110 is capable of supporting NOMA transmission), a capability of the UE 110 indicating that the UE supports NOMA transmission, a service that the UE 110 is not capable of supporting, a service that the UE 110 can technically support but currently will not support (e.g., due to a low battery condition), a QoS profile associated with the UE 110, and/or the PDU Session Information associated with the UE 110. In response to receiving the indication of the service condition (trigger 610), the gNB-CU 121 may initiate the NOMA configuration procedure 630 configuring the UE 110 to perform the NOMA transmission, as described regarding the NOMA configuration procedure 330 in FIG. 3.

The service condition may include capability information indicating that the UE 110 supports NOMA transmission. The gNB-CU 121 may receive an UE capability service condition in a service condition message 602 from the UE 110 to the gNB-DU 122 that is transferred using a service condition message 604 (e.g., an FLAP message) sent or transmitted through the F1 interface 117 between the gNB-DU 122 and the gNB-CU 121. The gNB-CU 121 may receive the service condition in a CN node message 606 from a core network node (e.g., AMF 152) using NG interface 102 through the core network interface 270. The gNB-CU 121 may receive (e.g., using Xn interface 116) the service condition in a message 608 from another base station 125 (e.g., gNB 125). In response to receiving the capability information, the gNB-CU 121 initiates the NOMA configuration procedure 630 to set up a corresponding RRC configuration configuring the UE 110 to perform NOMA transmission.

In another aspect, the service condition received in the CN node message 606 is a QoS profile associated with the UE 110. The gNB-CU 121 receives the QoS profile from a core network node (e.g., AMF 152 using NG interface 102 through the core network interface 270). In response to receiving the QoS profile associated with the UE 110, the gNB-CU 121 initiates the NOMA configuration procedure 630, according to the QoS profile.

In an additional aspect, the service condition received in the CN node message 606 is PDU Session Information associated with the UE 110. In some cases, the gNB-CU 121 receives the PDU Session Information from a core network node (e.g., AMF 152) using NG interface 102 through the core network interface 270. In response to receiving the PDU Session Information, the gNB-CU 121 initiates the NOMA configuration procedure 630, according to the PDU Session Information.

RRC-Assisted NOMA Configuration Procedures for gNB-DU

FIGS. 7-10 illustrate example methodologies 700, 800, 900, and 1000 for RRC-Assisted NOMA configurations where the base station is a gNB having a gNB-CU and at least one gNB-DU, and the gNB-DU decides that the UE should be configured to transmit in NOMA.

Figure 7:
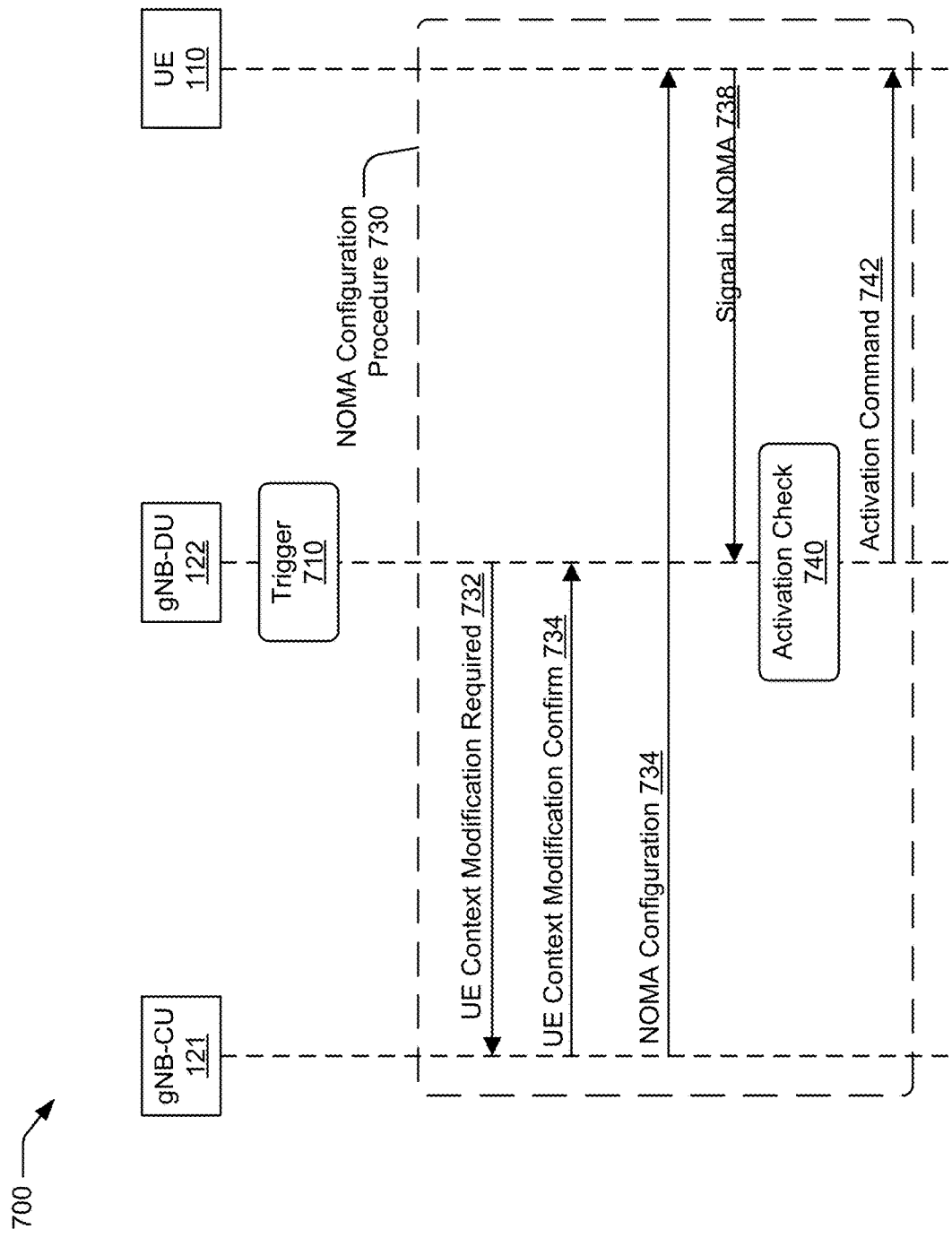
FIG. 7 is a sequence diagram illustration of RRC-assisted NOMA configuration procedures for gNB-DU.

In the methodology 700 for RRC-Assisted NOMA configuration of FIG. 7, in response to a trigger 710, the gNB-DU 122 may initiate a NOMA configuration procedure 730 to set up a corresponding RRC configuration configuring the UE 110 to perform NOMA transmission. The trigger 710 can relate to at least one of a message received from (e.g., on behalf of) a UE 110, uplink transmissions received from a UE 110, or an indication of at least one service condition (e.g., capability, QoS profile, PDU Session Information) of the UE 110.

In the NOMA configuration procedure 730, the gNB generates a NOMA configuration for configuring the UE 110 to perform NOMA transmission. The gNB-DU 122 sends a UE context modification required message 732 including the NOMA configuration to the gNB-CU 121, for instance in an F1AP message sent by F1 interface 117 of FIG. 1. In response to receiving the UE context modification required message 732, the gNB-CU 121 may send a UE context modification confirm message 734 to the gNB-DU 122, for instance in an F1AP message sent by F1 interface 117. In response to receiving the UE context modification required message 732, the gNB-CU 121 may send a NOMA configuration message 736, including the NOMA configuration, in an RRC message, to the UE 110. The NOMA configuration message 736 may be an RRC Reconfiguration message. The NOMA configuration may include one or more MA signatures and transmission occasions information for NOMA transmission. The MA signatures may be in one or more sets of MA signatures. In response to the NOMA configuration message 736, the UE 110 configures itself for NOMA transmission and may send a signal in NOMA 739 to the gNB-DU 122.

In the NOMA configuration procedure 730, the gNB-DU 122 may perform an activation check 740 to determine if receipt of the NOMA configuration in the NOMA configuration message 736 from the gNB-CU 121 triggered the UE 110 to activate NOMA transmission. The activation check 740 may include checking for a NOMA transmission (e.g., receipt of a signal in NOMA 739) from the UE 110. If, through the activation check 740, the gNB-DU 122 determines that the UE 110 has not activated NOMA transmission, then the gNB-DU 122 may transmit a NOMA activation command 742 to the UE 110 to activate NOMA transmission on the UE 110. In some cases, the NOMA activation command 742 may be DCI and/or a MAC CE.

Figure 8:
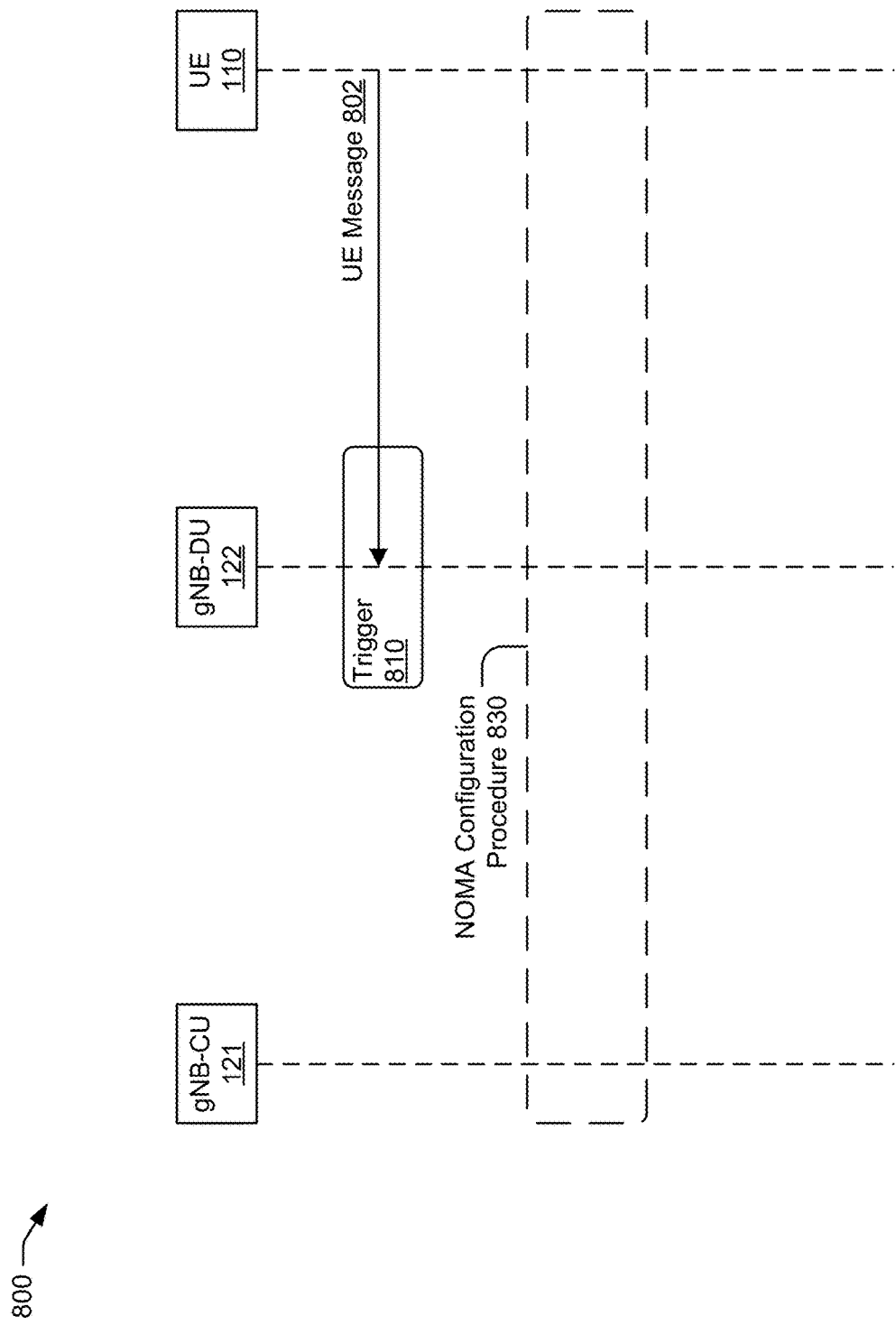
FIG. 8 is a sequence diagram illustration of RRC-assisted NOMA configuration procedures for gNB-DU.

In the example methodology 800 for RRC-Assisted NOMA configuration of FIG. 8, in response to a trigger 810, the gNB-DU 122 may initiate a NOMA configuration procedure 830 configuring the UE 110 to perform NOMA transmission. The trigger 810 may be the receipt by the gNB-DU 122 of a UE message 802 from the UE 110. The UE message 812 may be one or more messages. The UE message 802 may include one or more measurement reports from the UE 110. In some cases, the measurement reports are transmitted in one or more measurement report messages. In response to receiving the UE message 802 from the UE 110, the gNB-DU 122 may initiate the NOMA configuration procedure 830, as described regarding the NOMA configuration procedure 730 in FIG. 7, to trigger the setup of a corresponding RRC configuration configuring the UE 110 to perform NOMA transmission.

Figure 9:
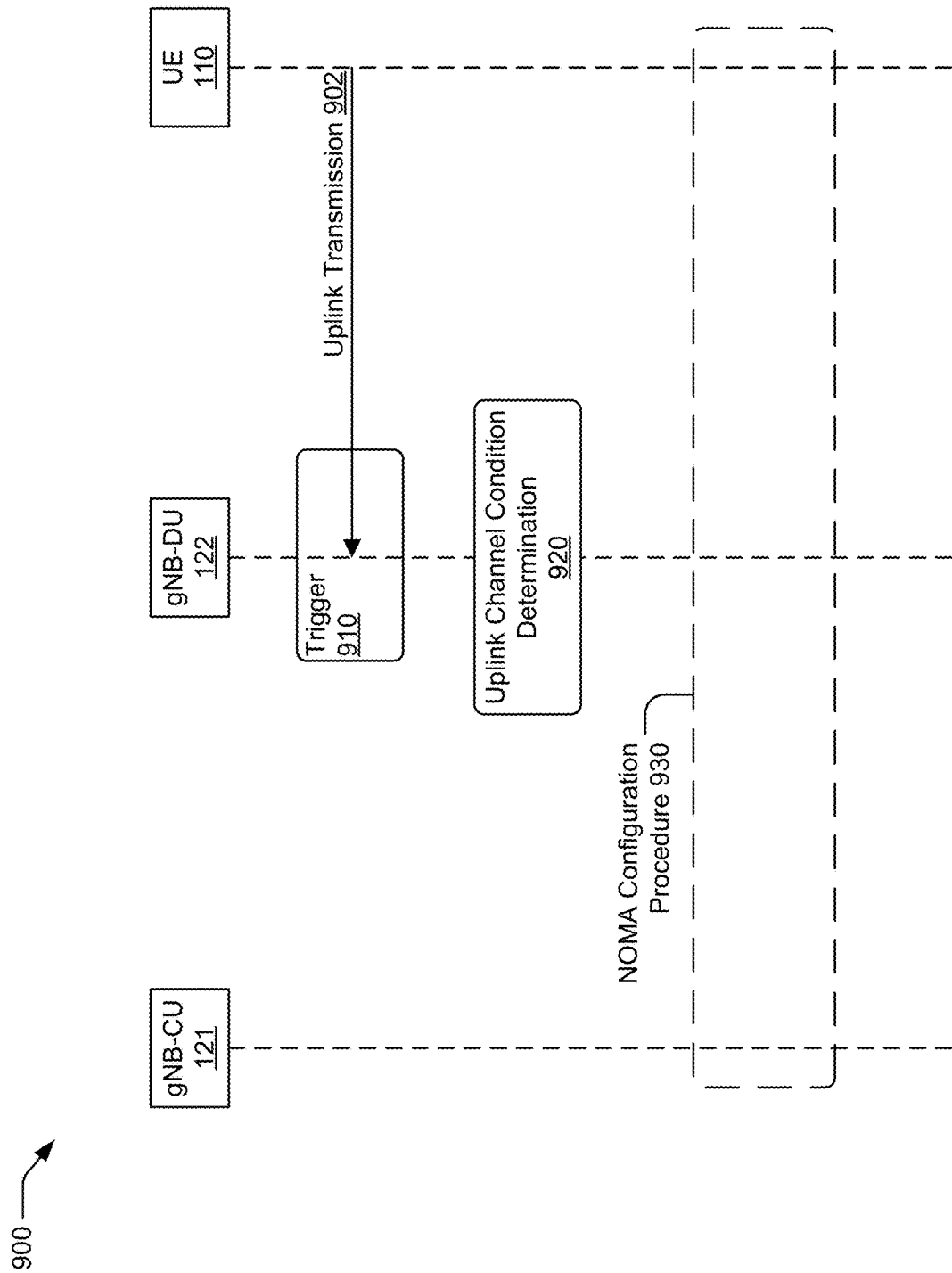
FIG. 9 is a sequence diagram illustration of RRC-assisted NOMA configuration procedures for gNB-DU.

In the example methodology 900 for RRC-Assisted NOMA configuration of FIG. 9, in response to a trigger 910, the gNB-DU 122 may initiate a NOMA configuration procedure 930 configuring the UE 110 to perform NOMA transmission. The trigger 910 may be the receipt by the gNB-DU 122 of one or more uplink transmissions 902 from the UE 110. Uplink transmissions 902 from multiple UE 110 may be scheduled with the same PUSCH resource. The one or more uplink transmissions 902 may include at least one of SRS transmissions, PUCCH transmissions, or PUSCH transmissions.

In response to receiving the one or more uplink transmissions 902 from the UE 110, the gNB-DU 122 may perform an uplink channel condition determination 920 determining if the UE 110 has an acceptable (e.g., above a static or dynamic threshold) uplink channel condition according to the one or more uplink transmissions 902. If the gNB-DU 122 determines that the UE 110 has an acceptable uplink channel condition, then the gNB-DU 122 may initiate a NOMA configuration procedure 930 configuring the UE 110 to perform NOMA transmission, as described regarding the NOMA configuration procedure 730 in FIG. 7.

Figure 10:
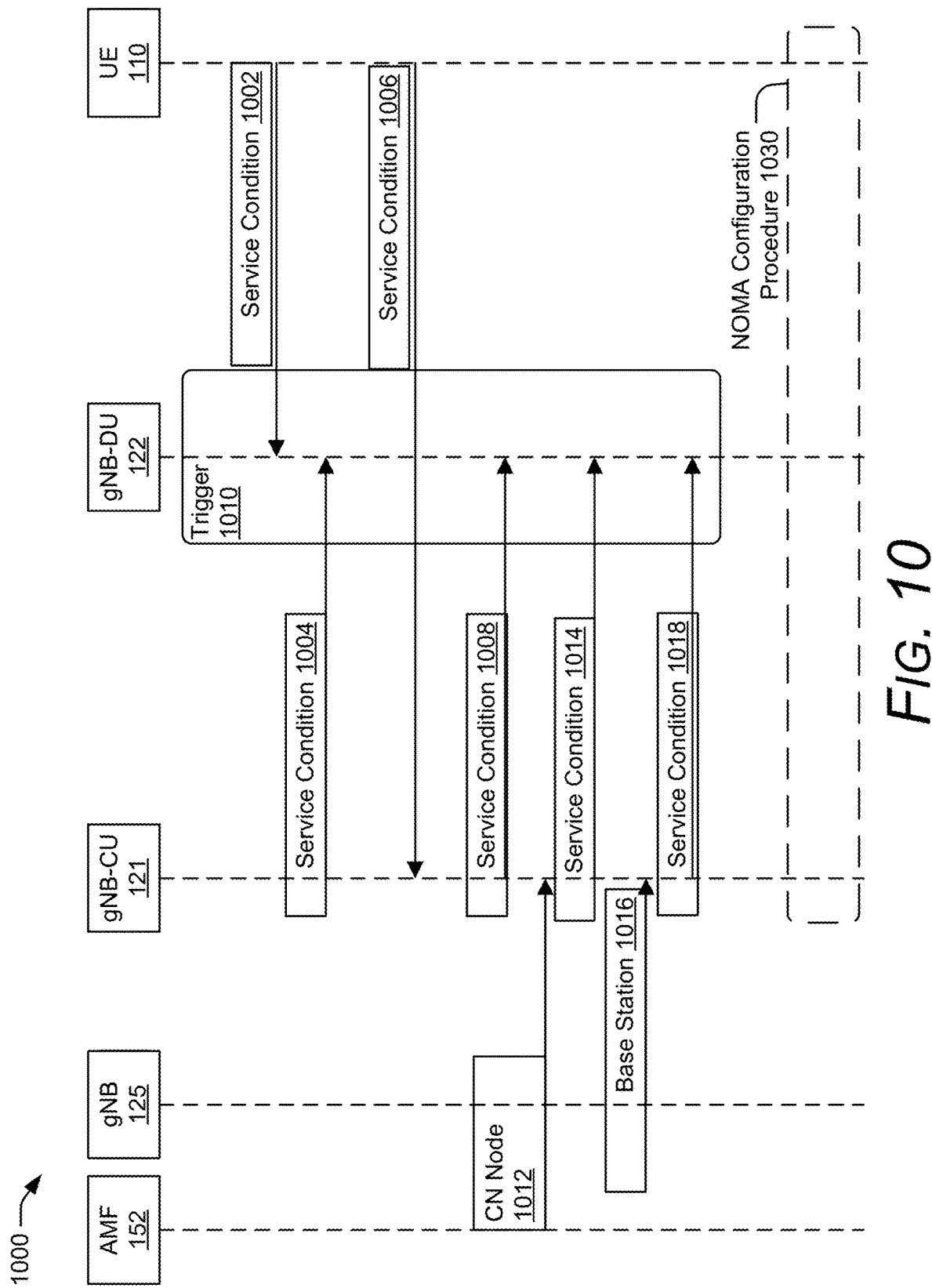
FIG. 10 is a sequence diagram illustration of RRC-assisted NOMA configuration procedures for gNB-DU.

In the example methodology 1000 for RRC-Assisted NOMA configuration of FIG. 10, in response to a trigger 1010, the gNB-DU 122 may initiate a NOMA configuration procedure 1030 configuring the UE 110 to perform NOMA transmission. The trigger may be the gNB-DU 122 receiving an indication of at least one service condition of the UE 110. The service condition may specify a service that the UE 110 is currently using, a service that the UE 110 is currently using and its QoS parameters, a service that the UE 110 is capable of supporting (e.g., that the UE 110 is capable of supporting NOMA transmission, a capability of the UE 110 indicating that the UE supports NOMA transmission), a service that the UE 110 is not capable of supporting, a service that the UE 110 can technically support but currently will not support (e.g., due to a low battery condition), a QoS profile associated with the UE 110, and/or the PDU Session Information associated with the UE 110. In response to the indication of the service condition, the gNB-DU 122 may initiate a NOMA configuration procedure 1030, as described regarding the NOMA configuration procedure 730 in FIG. 7, configuring the UE 110 to perform the NOMA transmission.

The service condition may be capability information indicating that the UE 110 supports NOMA transmission. The gNB-DU 122 may receive the UE capability service condition in a service condition message 1002 directly from the UE 110. The gNB-DU 122 may receive the UE capability service condition in a service condition message 1004 from a base station (e.g., gNB-CU 121). The UE 110 may transmit the UE capability service condition in a service condition message 1006 to the gNB-CU 121 and in response to receiving the service condition message 1006, the gNB-CU 121 may transmit a service condition message 1008 (e.g., a F1AP message) including the UE capability service condition to the gNB-DU 122.

The gNB-DU 122 may receive the service condition in a service condition message 1014 from the gNB-CU 121, which received the service condition in a CN node message 1012 from a core network node (e.g., AMF 152) through NG interface 102 through the core network interface 270. In response to the CN node message 1012, the gNB-CU 121 may transmit a service condition message 1014 (e.g., an F1AP message) including the UE capability service condition to the gNB-DU 122. The gNB-CU 121 may receive (e.g., through Xn interface 116) the service condition in a base station message 1016 from another base station 125 (e.g., gNB 125) and in response to the base station message 1016, the gNB-CU 121 may transmit service condition message 1018 including the UE capability service condition to the gNB-DU 122.

In response to receiving the capability information, the gNB-DU 122 may initiate a NOMA configuration procedure 1030 to set up a corresponding RRC configuration configuring the UE 110 to perform NOMA transmission, as described regarding the NOMA configuration procedure 730 in FIG. 7.

In one aspect, the service condition is a QoS profile associated with the UE 110. In some cases, the gNB-CU 121 receives (e.g., using Xn interface 116) the service condition in the base station message 1016 from another base station 125 (e.g., gNB 125) and in response to the base station message 1016, the gNB-CU 121 may transmit the service condition message 1018 including the QoS profile to the gNB-DU 122. In response to receiving the QoS profile associated with the UE 110, the gNB-DU 122 may initiate a NOMA configuration procedure 1030 to set up a corresponding RRC configuration configuring the UE 110 to perform NOMA transmission, according to the QoS profile.

In one aspect, the service condition is the PDU Session Information associated with the UE 110. The gNB-CU 121 may receive (e.g., using Xn interface 116) the PDU Session Information in the base station message 1016 from another base station 125 (e.g., gNB 125) and in response to the base station message 1016, the gNB-CU 121 may transmit the service condition message 1018 including the PDU Session Information to the gNB-DU 122. In response to receiving the PDU Session Information associated with the UE 110, the gNB-DU 122 may initiate a NOMA configuration procedure 1030 to set up a corresponding RRC configuration configuring the UE 110 to perform NOMA transmission, according to the PDU Session Information.

In one aspect, the gNB-DU 122 decides to configure the UE 110 to perform the NOMA transmission according to a QoS profile or the PDU Session Information associated to the UE. The gNB-DU 122 receives the QoS profile or the PDU Session Information from the gNB-CU. The gNB-CU 121 receives the QoS profile or the PDU Session Information from the core network node (e.g., AMF 152) through the core network interface 270 through the CN node message 1012 and transmits the QoS profile or the PDU Session Information to the gNB-DU 122 through the service condition message 1014.

gNB Communication with One or Multiple UE

With respect to the example methodologies for RRC-Assisted NOMA configuration described herein, a decision to configure a UE 110 to perform NOMA transmission is made in a base station (e.g., gNB) and, in the base station, a gNB-CU may interact with a gNB-DU to effectuate the configuration of the UE 110 to perform NOMA transmission. As discussed above, FIGS. 3-6 illustrate example methodologies 300, 400, 500, 600 for RRC-Assisted NOMA configuration where the gNB-CU 121 decides to configure the UE 110 to transmit in NOMA, and FIGS. 7-10 illustrate example methodologies 700, 800, 900, 1000 for RRC-Assisted NOMA configuration where the gNB-DU 122 decides to configure the UE to transmit in NOMA.

Utilizing one or more of these example methodologies for RRC-Assisted NOMA configuration, a gNB can communicate with one or multiple UEs 110 simultaneously in NOMA utilizing a communication procedure. Such a communication procedure can apply to both the example methodologies 300, 400, 500, 600 for RRC-Assisted NOMA configuration in FIGS. 3-6 where the gNB-CU 121 decides to configure the UE 110 to transmit in NOMA, and the example methodologies 700, 800, 900, 1000 for RRC-Assisted NOMA configuration in FIGS. 7-10 where the gNB-DU 122 decides to configure the UE 110 to transmit in NOMA.

A UE can transmit signals to a base station in a grant-based transmission or a grant-free transmission. In grant-based transmission, each uplink transmission sent by a UE must have a corresponding grant from the base station. A grant-based transmission is based on RRC configuration and DCI/MAC CE indication. In grant-free transmission, the base station reserves some resources to the UE and configures a grant to the UE in advance. After then, the UE can transmit signals to the base station without grant by using the configured resources. Current standards (e.g., 3GPP NR Release 15) provide for two types of configure grants to support grant-free transmission: Type-1 and Type-2. A Type-1 configure grant is based on RRC configuration and activation. A Type-2 configure grant is based on RRC configuration and DCI/MAC CE control signal activation.

Figure 11:
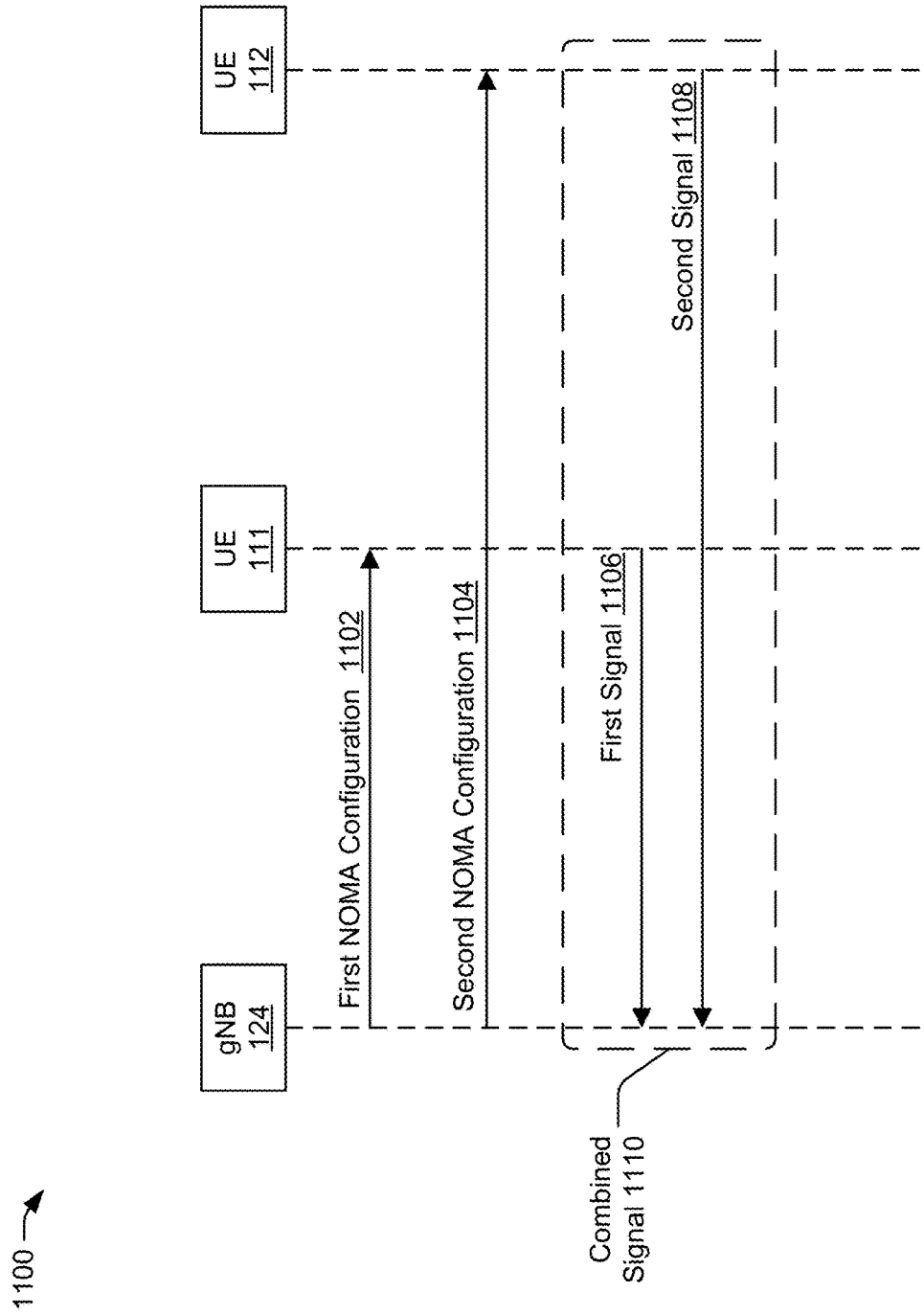
FIG. 11 is a sequence diagram illustration of configuration procedures for communication with multiple UE simultaneously in NOMA.

FIG. 11 illustrates an example NOMA communication procedure 1100 in which a base station 120 (e.g., gNB 124) may communicate with one or more UE 110 (e.g., UE 111, UE 112) simultaneously in NOMA. In communication procedure 1100, the UE 110 (UE 111, UE 112) have configure grant Type-1 uplink grants (RRC configuration and activation) that enable the UE 110 to transmit signals to the base station 120 (e.g., gNB 124). The communication procedure 1100 can apply to one or more of the example methodologies for RRC-Assisted NOMA configuration described above with respect to FIGS. 3-10.

In communication procedure 1100, gNB 124 (e.g., gNB-CU 121, gNB-DU 122) transmits a first NOMA configuration message 1102 (e.g., in an RRC message) to a first UE 111 and transmits a second NOMA configuration message 1104 (e.g., in an RRC message) to a second UE 112. The first NOMA configuration message 1102 conveys a first NOMA configuration. The second NOMA configuration message 1104 conveys a second NOMA configuration. The first and second NOMA configuration may include one, one set, or multiple sets of MA signatures and transmission occasions information for NOMA transmission. The transmission occasions information may include one or more time and frequency resources indications. The MA signatures in the first NOMA configuration may be different than, partially identical to, or completely identical to the second NOMA configuration. The transmission occasions conveyed by the first and the second NOMA configuration can partially overlap or can completely overlap.

As configured in the first NOMA configuration 1102, the first UE 111 transmits a first signal 1106 with a first MA signature on a first transmission occasion to the gNB 124. As configured in the second NOMA configuration 1104, the second UE 112 transmits a second signal 1108 with a second MA signature on a second transmission occasion to the gNB 124. The gNB 124 receives a combined signal 1110 including the first signal 1106 with the first MA signature and the second signal 1108 with the second MA signature.

The gNB 124 utilizes a NOMA performing multiple-user detection receiver (MUD receiver) to recover at least one of the first signal 1106 or the second signal 1108 from the combined signal 1110. The MUD receiver may recover the first signal 1106 and the second signal 1108 from the combined signal 1110 by subtracting the first signal 1106 from the combined signal 1110 according to the first MA signature and subtracting the second signal 1108 from the combined signal 1110 according to the second MA signature. In some cases, the MUD receiver may implement Successive Interference Cancellation (SIC), Parallel Interference Cancellation (PIC), and/or Hybrid Interference Cancellation (HIC).

Figure 12:
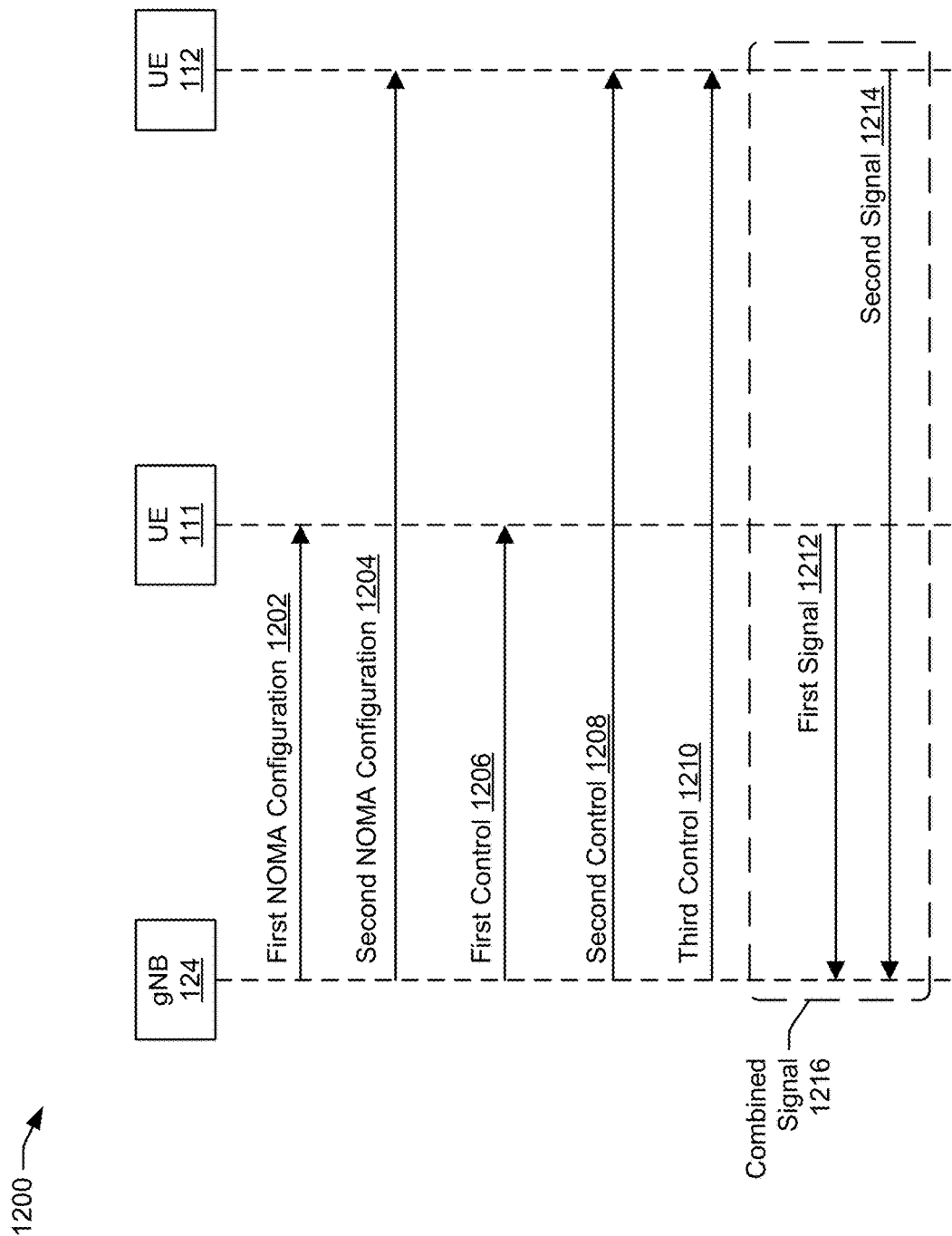
FIG. 12 is a sequence diagram illustration of configuration procedures for communication with multiple UE simultaneously in NOMA.

FIG. 12 illustrates an example NOMA communication procedure 1200 in which a base station 120 (e.g., gNB 124) may communicate with one or more UE 110 (e.g., UE 111, UE 112) simultaneously in NOMA. In the communication procedure 1200, the UE 110 (e.g., UE 111, UE 112) have configure grant Type-2 uplink grants (RRC configuration, DCI/MAC CE activation) that enable the UE 110 to transmit signals to a base station 120 (gNB 124). The communication procedure 1200 can apply to one or more of the example methodologies for RRC-Assisted NOMA configuration described above with respect to FIGS. 3-10.

In communication procedure 1200, gNB 124 (e.g., gNB-CU 121, gNB-DU 122) transmits a first NOMA configuration in a first NOMA configuration message 1202 (e.g., an RRC message) to a first UE 111 and gNB 124 transmits a second NOMA configuration in a second NOMA configuration message 1204 (e.g., an RRC message) to a second UE 112. The first NOMA configuration message 1202 conveys a first NOMA configuration. The second NOMA configuration message 1204 conveys a second NOMA configuration. The first and second NOMA configurations may include one, one set, or multiple sets of MA signatures and transmission occasions information for NOMA transmission. The transmission occasions information may include one or more time and frequency resources indications. The MA signatures in the first NOMA configuration may be different than, partially identical to, or completely identical to the second NOMA configuration. The transmission occasions information conveyed by the first and the second NOMA configuration can partially overlap or can completely overlap.

In communication procedure 1200, after the gNB 124 has configured both UE 111 and UE 112 with their respective NOMA configurations, the gNB 124 transmits a first control signal in a first control message 1206 to the first UE 111 and transmits a second control signal in a second control message 1208 to the second UE 112. In some implementations, the first control signal and/or the second control signal can be DCI and/or MAC CE. Assisted by the DCI/MAC CE, the UE 111 and UE 112 can each activate their respective NOMA configurations.

In some implementations, the first control message 1206 sent to the first UE 111 contains a first activation/deactivation indicator. The first activation/deactivation indicator may be a single bit or a bitmap. The second control message 1208 sent to the second UE 112 may contain a second activation/deactivation indicator. The second activation/deactivation indicator may be a single bit or a bitmap.

In response to receiving the first activation/deactivation indicator in the first control message 1206, if the first activation/deactivation indicator indicates activation, then the first UE 111 may transmit a first signal 1212 with a first MA signature on a first transmission occasion to the gNB 124, as configured in the first NOMA configuration 1202. In response to receiving the second activation/deactivation indicator in the second control message 1208, if the second activation/deactivation indicator indicates activation, then the second UE 112 may transmit a second signal 1214 with a second MA signature on a second transmission occasion to the gNB 124, as configured in the second NOMA configuration 1204.

In aspects, the gNB 124 can transmit one or multiple control messages to one of the UE during a transmission occasion of the other UE. Utilizing such a procedure allows the gNB 124 to keep part of one UE active while leaving the other UE silent, thereby further reducing interference. For example, the gNB 124 can transmit a third control message 1210 to the second UE 112 during a transmission occasion for UE 111.

The gNB 124 may receive a combined signal 1220 includes the first signal 1212 with the first MA signature and the second signal 1214 with the second MA signature. The gNB 124 may utilize a MUD receiver (e.g., NOMA performing MUD receiver) to recover at least one of the first signal 1212 or the second signal 1214 from the combined signal 1216. The MUD receiver may recover the first signal 1212 and the second signal 1214 from the combined signal 1216 by subtracting the first signal 1212 from the combined signal 1216 according to the first MA signature and subtracting the second signal 1214 from the combined signal 1216 according to the second MA signature. The MUD receiver may implement SIC, PIC, and/or HIC.

Figure 13:
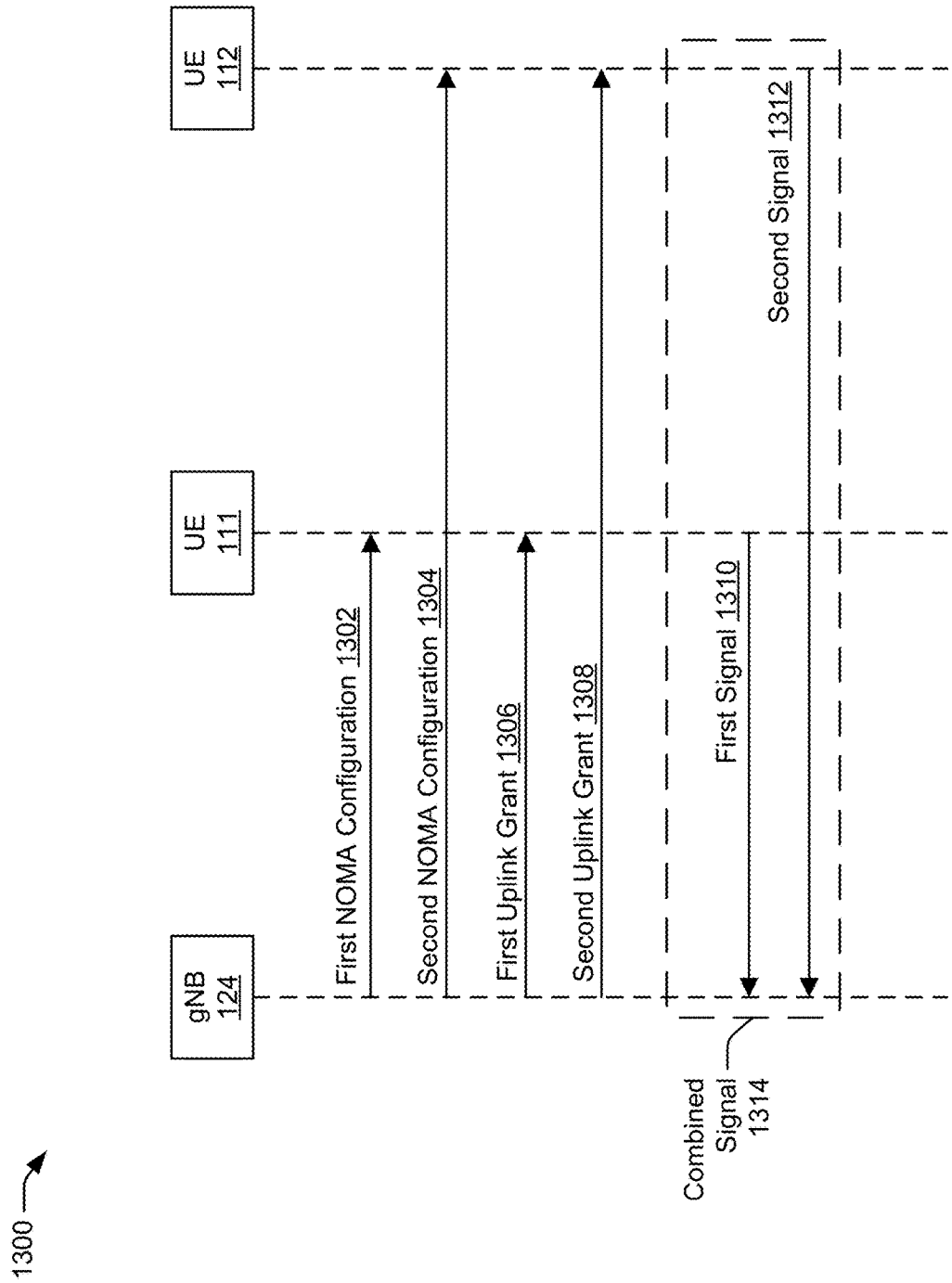
FIG. 13 is a sequence diagram illustration of configuration procedures for communication with multiple UE simultaneously in NOMA.

FIG. 13 illustrates an example NOMA communication procedure 1300. In the communication procedure 1300, a base station 120 (e.g., gNB 124) may communicate with one or more UE 110 (e.g., UE 111, UE 112) simultaneously in NOMA. In the communication procedure 1300, the UE 110 (UE 111, UE 112) have grant-based uplink grants (RRC configuration, DCI/MAC CE indication) that enable the UE 110 to transmit signals to the base station 120 (e.g., gNB 124). The communication procedure 1300 can apply to one or more of the example methodologies for RRC-Assisted NOMA configuration described above with respect to FIGS. 3-10.

In communication procedure 1300, the gNB 124 (e.g., gNB-CU 121, gNB-DU 122) transmits a first NOMA configuration message 1302 (e.g., an RRC message) to a first UE 111 and the gNB 124 transmits a second NOMA configuration message 1304 (e.g., an RRC message) to a second UE 112. The first NOMA configuration message 1302 conveys a first NOMA configuration. The second NOMA configuration message 1304 conveys a second NOMA configuration. The first and second NOMA configurations may include one, one set, or multiple sets of MA signatures for NOMA transmission. The MA signatures in the first NOMA configuration may be different than, partially identical to, or completely identical to the second NOMA configuration.

After the NOMA configuration of a UE 110 (e.g., UE 111, UE 112) is set, the gNB 124 may configure an uplink grant to transmit in NOMA for that UE. The uplink grant to transmit in NOMA for the UE may be according to a received scheduling request sent from that UE. The uplink grant for the UE may be according to buffer status report sent from that UE. The gNB 124 gives both the first UE 111 and the second UE 112 an uplink grant to transmit in NOMA simultaneously, respectively through an uplink grant transmitted in a first uplink grant message 1306 sent to UE 111 and an uplink grant transmitted in a second uplink grant message 1308 sent to UE 112. The first uplink grant transmitted in the first uplink grant message 1306 includes a first MA signature indicator corresponding to the first NOMA configuration, and a first transmission occasion. The second uplink grant transmitted in the second uplink grant message 1308 includes a second MA signature indicator corresponding to the second NOMA configuration, and a second transmission occasion.

In response to receiving the first uplink grant in the first uplink grant message 1306, the first UE 111 transmits a first signal 1310 with the first MA signature on the first transmission occasion. In response to receiving the second uplink grant in the second uplink grant message 1308, the second UE 112 transmits a second signal 1312 with the second MA signature on the second transmission occasion.

The gNB 124 receives a combined signal 1314 that includes the first signal 1310 with the first MA signature and the second signal 1312 with the second MA signature. The gNB 124 utilizes a MUD receiver (e.g., NOMA performing MUD receiver) to recover at least one of the first signal 1310 or the second signal 1312 from the combined signal 1320. In some cases, the MUD receiver recovers the first signal 1310 and the second signal 1312 from the combined signal 1314 by subtracting the first signal 1310 from the combined signal 1314 according to the first MA signature and subtracting the second signal 1312 from the combined signal 1314 according to the second MA signature. The MUD receiver may implement SIC, PIC, and/or HIC.

Example Methods

Example methods 1400 and 1500 are described with reference to FIGS. 14 and 15, respectively, in accordance with one or more aspects of NOMA configuration procedures in split base station architectures. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-a-Chip systems (SoCs), Complex Programmable Logic Devices (CPLDs), and the like.

Figure 14:
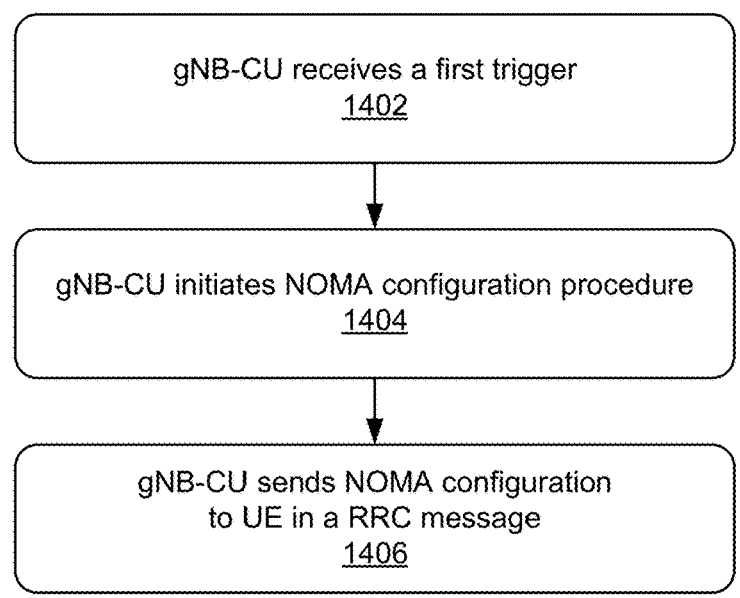
FIG. 14 illustrates an example method for configuring and communicating with user equipment by a base station.
Figure 15:
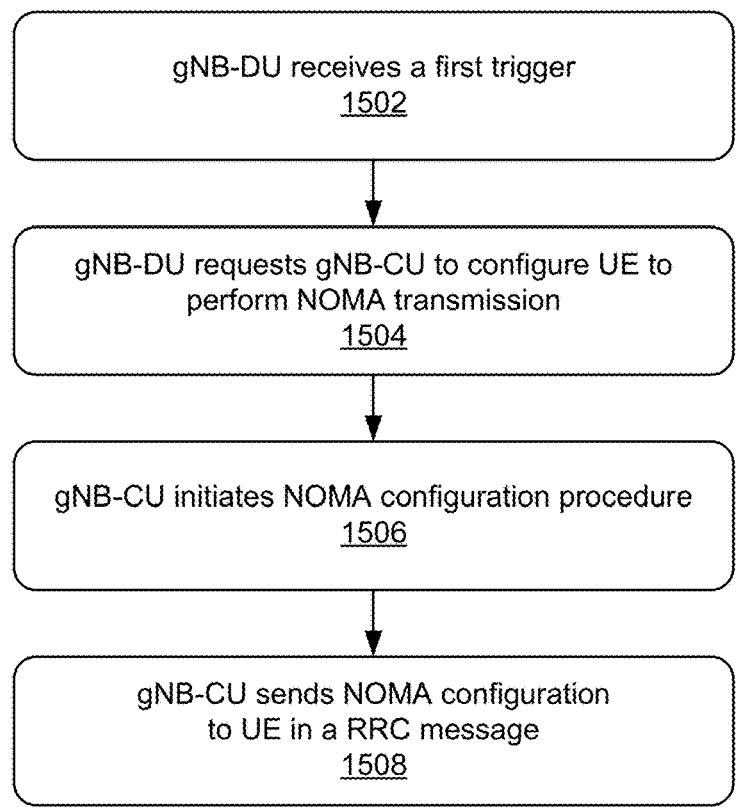
FIG. 15 illustrates an example method for configuring and communicating with user equipment by a base station.

FIGS. 14 and 15 depict example methods 1400 and 1500 for configuring and communicating with at least one UE (e.g., a first UE, a second UE) by a base station (e.g., gNB, gNB-CU, gNB-DU). Methods 1400 and 1500 illustrate sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to example environment 100 of FIG. 1, example device diagrams 200 of FIG. 2, and entities detailed in FIG. 1, the reference to which is made for example only. The techniques described in this specification are not limited to performance by one entity or multiple entities operating on one device.

The user equipment in the example methods 1400 and 1500 may be implemented as any suitable computing or electronic device, such as a user equipment, a mobile communication device, a computing device, a client device, a mobile phone, a tablet computer, a laptop computer, a communication device, an entertainment device, a gaming device, a mobile gaming console, a personal media device, a media playback device, a charging station, an Advanced Driver Assistance System (ADAS), a point-of-sale (POS) transaction system, a health monitoring device, a drone, a camera, a wearable smart-device, a navigation device, a mobile-internet device, an Internet home appliance capable of wireless Internet access and browsing, an IoT device, a 5G NR user equipment, and/or other types of user devices. The base station may represent or be implemented as another device, radio access node, wireless communication node, or other suitable piece of equipment that facilitates wireless communication (using a wireless link) between user equipment and a communication network, such as a gNB base station, an Enhanced NodeB (eNB) base station, an eNodeB base station, a base transceiver system, a Wireless Local Access Network (WLAN) router, a satellite, a terrestrial television broadcast tower, an access point, a peer-to-peer device, another smartphone acting as a base station, and so forth.

Method 1400 is a method for configuring and communicating with at least one UE 110 by a base station 120. In method 1400, the base station is a gNB base station having a gNB-CU and at least one gNB-DU.

At 1402, the gNB-CU receives a trigger relating to a UE. The trigger may include at least one of: at least one message received from (e.g., on behalf of) the UE, at least one uplink transmission received from the UE, or an indication of at least one service condition of the UE. The trigger may be the gNB-CU receiving an indication of at least one service condition of the UE. The service condition of the UE may include at least one of a capability of the UE indicating that the UE supports NOMA transmission, a QoS profile associated with the UE, or PDU Session Information associated with the UE. The trigger may be a message received on behalf of the UE. The trigger may include one or more measurement report messages including one or more measurement results. The trigger may be a message received on behalf of the UE that includes a request message transmitted from the gNB-DU to the gNB-CU requesting configuration of the UE to perform NOMA transmission. In some cases, the trigger is at least one uplink transmission from the UE and the uplink transmission at least one of SRS transmissions, PUCCH transmissions, or PUSCH transmissions.

At 1404, in response to the first trigger, the gNB-CU initiates a NOMA configuration procedure configuring the UE to perform NOMA transmission. At 1406, the gNB-DU transmits a NOMA configuration to the UE in an RRC message, including a plurality of MA signatures and transmission occasions information for NOMA transmission. As a result of receiving the RRC message, the UE configures itself for NOMA transmission.

Method 1500 is a method for configuring and communicating with at least one UE (e.g., a first UE, a second UE) by a base station. In method 1500, the base station is a gNB base station having a gNB-CU and at least one gNB-DU.

At 1502, the gNB-DU receives a trigger relating to a UE. The trigger may include one or more of: at least one message received from (e.g., on behalf of) the UE, at least one uplink transmission received from the UE, and/or an indication of at least one service condition of the UE. The trigger may be a service condition of the UE and may include at least one of a capability of the UE indicating that the UE supports NOMA transmission, a QoS profile associated with the UE, and/or PDU Session Information associated with the UE. The message received on behalf of the UE may include one or more measurement report messages, including one or more measurement results. The trigger may be a message received on behalf of the UE includes a request message transmitted from the gNB-DU to the gNB-CU requesting configuration of the UE to perform NOMA transmission. In some cases, the trigger is at least one uplink transmission from the UE and the uplink transmission at least one of SRS transmissions, PUCCH transmissions, and/or PUSCH transmissions.

At 1504, the gNB-DU requests the gNB-CU to configure the UE to perform NOMA transmission. At 1506, responsive to the request, the gNB-CU initiates a NOMA configuration procedure configuring the first UE to perform NOMA transmission. At 1508, the gNB-CU of the gNB transmits a NOMA configuration that includes a plurality of MA signatures and transmission occasions information for NOMA transmission to the UE in an RRC message. As a result of receiving the RRC message from the gNB-CU, the UE configures itself for NOMA transmission

EXAMPLES

In the following paragraphs, some examples are described.

Example 1: A method for configuring and communicating with at least one user equipment (UE) by a Next Generation Node B base station (gNB) having a Next Generation Node B base station Central Unit (gNB-CU) and a Next Generation Node B base station Distributed Unit (gNB-DU), the method comprising: the gNB receiving a first trigger relating to a first UE; wherein in response to the first trigger, the gNB setting up a corresponding RRC configuration configuring the first UE to perform NOMA transmission, comprising: the gNB-CU transmitting to the gNB-DU a non-orthogonal multiple access (NOMA) configuration comprising a plurality of multiple access (MA) signatures and transmission occasions information for NOMA transmission; and the gNB-DU transmitting the NOMA configuration to the first UE in a Radio Resource Control (RRC) message.

Example 2: The method of example 1, wherein the gNB receiving the first trigger comprises: receiving an indication of at least one service condition of the first UE comprising at least one of: a capability of the first UE indicating that the first UE supports NOMA transmission; a quality of service (QoS) profile associated with the first UE; or the protocol data unit (PDU) session information associated with the first UE.

Example 3: The method of example 2, wherein the receiving the indication of the at least one service condition comprises: receiving a capability of the first UE indicating that the first UE supports NOMA transmission; and wherein the gNB receiving the first trigger comprises: the gNB-CU receiving the service condition in a UE message from at least one of: the first UE; a core network node; or another base station.

Example 4: The method of example 2, wherein: the receiving the indication of the at least one service condition comprises receiving a quality of service (QoS) profile associated with the first UE or the protocol data unit (PDU) session information associated with the first UE; and wherein the gNB setting up a corresponding RRC configuration configuring the first UE to perform NOMA transmission further comprises: the gNB-CU configuring the first UE according to the QoS profile or the PDU session information.

Example 5: The method of example 1, wherein the gNB receiving a first trigger comprises: receiving at least one UE message on behalf of the first UE; and the at least one UE message received on behalf of the first UE comprises one or more measurement reports from the first UE.

Example 6: The method of example 5, wherein the at least one UE message received on behalf of the first UE comprises: a request message transmitted from the gNB-DU to the gNB-CU requesting configuration of the first UE to perform NOMA transmission.

Example 7: The method of example 1, wherein the gNB receives the at least one uplink transmission from the first UE, and the at least one uplink transmission comprises at least one of sounding reference signals (SRS), physical uplink control channels (PUCCHs), and/or physical uplink shared channels (PUSCHs).

Example 8: The method of example 7, further comprising: in response to the gNB receiving the at least one uplink transmission, the gNB-DU transmitting a request message to the gNB-CU, wherein the request message comprises a request for the gNB-CU to configure the first UE to perform NOMA transmission.

Example 9: The method of example 1, further comprising: the gNB-DU making an uplink channel condition determination determining if the first UE has an acceptable uplink channel condition according to the at least one uplink transmission in response to receiving the at least one uplink transmission from the first UE; wherein if the gNB-DU determines that the first UE has an acceptable uplink channel condition, then the gNB-DU transmitting a request message to the gNB-CU; and wherein the request message comprises a request for the gNB-CU to configure the first UE to perform NOMA transmission.

Example 10: The method of example 1, further comprising: the gNB-DU performing an activation check to determine if the first UE has activated NOMA transmission; wherein if the gNB-DU determines that the first UE has not activated NOMA transmission, then the gNB-DU transmitting a NOMA activation command to the first UE; and wherein the NOMA activation command comprises Downlink Control Information (DCI) or a MAC control element (CE).

Example 11: The method of example 1, wherein the gNB-CU transmitting the NOMA configuration to the gNB-DU comprises: sending a UE context setup request message including a NOMA configuration or a UE context modification request message including a NOMA configuration; the method further comprising: the gNB-DU transmitting a response message to the gNB-CU in response to receiving the NOMA configuration from the gNB-CU: wherein if the NOMA configuration comprises a UE context setup request message, then the method further comprises the gNB-DU transmitting a UE context setup request message to the gNB-CU; and wherein if the NOMA configuration comprises a UE context modification request message, then the method further comprises the gNB-DU transmitting a UE context modification response message to the gNB-CU.

Example 12: The method of example 1, wherein: the at least one user equipment (UE) further comprises a second UE; the method further comprising the gNB receiving a second trigger relating to a second UE; and the second trigger comprises at least one of: at least one UE message received from the second UE, at least one uplink transmission received from the second UE, and/or an indication of at least one service condition of the second UE.

Example 13: The method of example 12, wherein: in response to the second trigger, the gNB setting up a corresponding RRC configuration configuring the second UE to perform NOMA transmission, comprising: the gNB-CU transmitting a second NOMA configuration to the gNB-DU, the second NOMA configuration including a plurality of MA signatures and transmission occasions information for NOMA transmission; and the gNB-DU transmitting the second NOMA configuration to the second UE in a second RRC message; the gNB configuring Type-1 uplink grants for the first UE and the second UE; the gNB receiving a combined signal comprising a first signal from the first UE with a first MA signature on a first transmission occasion and a second signal from the second UE with a second MA signature on a second transmission occasion; and the gNB utilizing a NOMA performing multiple-user detection receiver (MUD receiver) to recover the first signal and the second signal from the combined signal.

Example 14: The method of example 12, wherein: in response to a second trigger, the gNB-CU setting up a corresponding RRC configuration configuring a second UE to perform NOMA transmission, comprising: the gNB-CU transmitting a second NOMA configuration to the gNB-DU in a command message, the second NOMA configuration including a plurality of MA signatures and transmission occasions information for NOMA transmission; and the gNB-DU transmitting the second NOMA configuration to the second UE in a second RRC message; the gNB configuring Type-2 uplink grants for the first UE and the second UE; the gNB transmitting a first control message to the first UE, wherein the first control message contains a first activation/deactivation indicator; the gNB transmitting a second control message to the second UE, wherein the second control message contains a second activation/deactivation indicator; the gNB transmitting a first control message to the second UE during a transmission occasion for the first UE; the first UE transmitting a first signal with a first MA signature on a first transmission occasion to the gNB upon receiving a first activation/deactivation indicator indicating activation; the second UE transmitting a second signal with a second MA signature on a second transmission occasion to the gNB upon receiving a second activation/deactivation indicator indicating activation; the gNB receiving a combined signal comprising the first signal and the second signal; and the gNB utilizing a NOMA performing multiple-user detection receiver (MUD receiver) to recover the first signal and the second signal from the combined signal.

Example 15: The method of example 12, further comprising: in response to a second trigger, the gNB-CU setting up a corresponding RRC configuration configuring a second UE to perform NOMA transmission comprising: the gNB-CU transmitting a second NOMA configuration to the gNB-DU in a command message, the second NOMA configuration including a plurality of MA signatures for NOMA transmission; and the gNB-DU transmitting the second NOMA configuration to the second UE in a second RRC message; the gNB transmitting a first uplink grant in a first uplink grant message to the first UE, the first uplink grant message configuring the first UE to transmit in NOMA simultaneously with the second UE, the first uplink grant including a first MA signature indicator corresponding to the first NOMA configuration and a first transmission occasion; the gNB transmitting a second uplink grant in a second uplink grant message to the second UE, the second uplink grant message configuring the second UE to transmit in NOMA simultaneously with the first UE, the second uplink grant including a second MA signature indicator corresponding to the second NOMA configuration and a second transmission occasion; the gNB receiving a combined signal comprising a first signal with a first MA signature on a first transmission occasion from the first UE and a second signal with a second MA signature on a second transmission occasion from the second UE; and the gNB utilizing a NOMA performing multiple-user detection receiver (MUD receiver) to recover the first signal and the second signal from the combined signal.

Example 16: The method of example 15, further comprising: the gNB configuring the first uplink grant for the first UE is according to a received scheduling request or a buffer status report sent from the first UE, and the gNB configuring the second uplink grant for the second UE is according to a received scheduling request or a buffer status report sent from the second UE.

Example 17: A method for configuring and communicating with at least one user equipment (UE) by a Next Generation Node B base station (gNB) having a Next Generation Node B base station Central Unit (gNB-CU) and a Next Generation Node B base station Distributed Unit (gNB-DU), the method comprising: the gNB receiving a first trigger relating to a first UE; wherein in response to the first trigger, the gNB setting up a corresponding RRC configuration configuring the first UE to perform NOMA transmission, comprising: the gNB-DU transmitting a non-orthogonal multiple access (NOMA) configuration to the first UE, the NOMA configuration including a plurality of multiple access (MA) signatures and transmission occasions information for NOMA transmission; and the gNB-DU transmits a UE context modification required message including the NOMA configuration to the gNB-CU.

Example 18: The method of example 17, wherein the gNB receiving the first trigger comprises: receiving an indication of at least one the service condition of the first UE comprising at least one of: a capability of the first UE indicating that the first UE supports NOMA transmission; a quality of service (QoS) profile associated with the first UE; and/or the protocol data unit (PDU) session information associated with the first UE.

Example 19: The method of example 18, wherein the receiving the indication of the at least one service condition comprises: receiving a capability of the first UE indicating that the first UE supports NOMA transmission; and wherein the gNB receiving the first trigger comprises: the gNB-DU receiving the service condition in a UE message from at least one of: the first UE; or the gNB-CU.

Example 20: The method of example 19, wherein: the receiving the indication of the at least one service condition comprises receiving a quality of service (QoS) profile associated with the first UE or the protocol data unit (PDU) session information associated with the first UE; the service condition of the first UE is received by the gNB-CU; and the method further comprises: the gNB-CU transmitting the NOMA configuration, including the service condition to the gNB-DU; and the gNB-CU transmitting the NOMA configuration, including the quality of service (QoS) profile associated with the first UE, to the UE in an RRC message configuring the first UE to perform NOMA transmission according to the quality of service (QoS) profile or the PDU session information.

Example 21: The method of example 17, wherein the gNB receiving the first trigger comprises: receiving at least one UE message on behalf of the first UE; and the at least one UE message received from the first UE comprises one or more measurement reports from the first UE.

Example 22: The method of example 17, further comprising: the gNB-DU receiving the at least one uplink transmission from the first UE; wherein in response to the gNB-DU receiving the at least one uplink transmission, the gNB-DU transmitting a request message to the gNB-CU; and wherein the request message comprises a request for the gNB-CU to configure the first UE to perform NOMA transmission.

Example 23: The method of example 22, wherein: the at least one uplink transmission comprises at least one of: sounding reference signals (SRS), physical uplink control channels (PUCCHs), or physical uplink shared channels (PUSCHs).

Example 24: The method of example 17, further comprising: the gNB-DU making an uplink channel condition determination determining if the first UE has an acceptable uplink channel condition according to the at least one uplink transmission in response to receiving the at least one uplink transmission from the first UE; wherein if the gNB-DU determines that the first UE has an acceptable uplink channel condition, then the gNB-DU transmitting a request message to the gNB-CU; and wherein the request message comprises a request for the gNB-CU to configure the first UE to perform NOMA transmission.

Example 25: The method of example 24, wherein: the gNB-DU performing an activation check to determine if the first UE has activated NOMA transmission; and wherein if the gNB-DU determines that the first UE has not activated NOMA transmission, then the gNB-DU transmitting a NOMA activation command to the first UE; and wherein the NOMA activation command comprises Downlink Control Information (DCI) or a MAC control element (CE).

Example 26: The method of example 17, wherein: the at least one user equipment (UE) further comprises a second UE; the method further comprising the gNB receiving a second trigger relating to a second UE; and wherein the second trigger comprises at least one of: at least one UE message received from the second UE; at least one uplink transmission received from the second UE; or an indication of at least one service condition of the second UE.

Example 27: The method of example 26, wherein: in response to a second trigger, the gNB-CU setting up a corresponding RRC configuration configuring a second UE to perform NOMA transmission, comprising: the gNB-CU transmitting a second NOMA configuration to the gNB-DU, the second NOMA configuration including a plurality of MA signatures and transmission occasions information for NOMA transmission; and the gNB-DU transmitting the second NOMA configuration to the second UE in a second RRC message; the gNB configuring Type-1 uplink grants for the first UE and the second UE; the gNB receiving a combined signal comprising a first signal from the first UE with a first MA signature on a first transmission occasion and a second signal from the second UE with a second MA signature on a second transmission occasion; and the gNB utilizing a NOMA performing multiple-user detection receiver (MUD receiver) to recover the first signal and the second signal from the combined signal.

Example 28: The method of example 26, wherein: in response to a second trigger, the gNB-CU setting up a corresponding RRC configuration configuring a second UE to perform NOMA transmission, comprising: the gNB-CU transmitting a second NOMA configuration to the gNB-DU, the second NOMA configuration including a plurality of MA signatures and transmission occasions information for NOMA transmission; and the gNB-DU transmitting the second NOMA configuration to the second UE in a second RRC message; the gNB configuring Type-2 uplink grants for the first UE and the second UE; the gNB transmitting a first control message to the first UE, wherein the first control message contains a first activation/deactivation indicator; the gNB transmitting a second control message to the second UE, wherein the second control message contains a second activation/deactivation indicator; the gNB transmitting a first control message to the second UE during a transmission occasion for the first UE; the first UE transmitting a first signal with a first MA signature on a first transmission occasion to the gNB upon receiving a first activation/ deactivation indicator indicating activation; the second UE transmitting a second signal with a second MA signature on a second transmission occasion to the gNB upon receiving a second activation/deactivation indicator indicating activation, the gNB receiving a combined signal comprising the first signal and the second signal; and the gNB utilizing a NOMA performing multiple-user detection receiver (MUD receiver) to recover the first signal and the second signal from the combined signal.

Example 29: The method of example 26, wherein: in response to a second trigger, the gNB-CU setting up a corresponding RRC configuration configuring a second UE to perform NOMA transmission, comprising: the gNB-CU transmitting a second NOMA configuration to the gNB-DU, the second NOMA configuration including a plurality of MA signatures for NOMA transmission; and the gNB-DU transmitting the second NOMA configuration to the second UE in a second RRC message; the gNB transmitting a first uplink grant in a first uplink grant message to the first UE, the first uplink grant message configuring the first UE to transmit in NOMA simultaneously with the second UE, the first uplink grant including a first MA signature indicator corresponding to the first NOMA configuration and a first transmission occasion; the gNB transmitting a second uplink grant in a second uplink grant message to the second UE, the second uplink grant message configuring the second UE to transmit in NOMA simultaneously with the first UE, the second uplink grant including a second MA signature indicator corresponding to the second NOMA configuration and a second transmission occasion; the gNB receiving a combined signal comprising a first signal with a first MA signature on a first transmission occasion from the first UE and a second signal with a second MA signature on a second transmission occasion from the second UE; and the gNB utilizing a NOMA performing multiple-user detection receiver (MUD receiver) to recover the first signal and the second signal from the combined signal.

Example 30: The method of example 29, wherein: the gNB configuring the first uplink grant for the first UE is according to a received scheduling request or a buffer status report sent from the first UE, and the gNB configuring the second uplink grant for the second UE is according to a received scheduling request or a buffer status report sent from the second UE.

Example 31: A method for configuration of user equipment for non-orthogonal multiple access transmission by a base station, the method comprising: receiving, by the base station, a first trigger relating to a first user equipment; generating, by the base station, a non-orthogonal multiple access configuration, wherein the non-orthogonal multiple access configuration includes a plurality of multiple access signatures and transmission occasions information for non-orthogonal multiple access transmission; and responsive to the first trigger, configuring, by the base station, the first user equipment to perform non-orthogonal multiple access transmission by at least one of: a Central Unit of the base station transmitting a first message including the non-orthogonal multiple access configuration to a Distributed Unit of the base station; the Central Unit transmitting a second message including the non-orthogonal multiple access configuration to the first user equipment; or the Distributed Unit transmitting a third message including the non-orthogonal multiple access configuration to the Central Unit.

Example 32: The method of example 31, wherein the base station receiving the first trigger relating to the first user equipment comprises at least one of: receiving, by the Central Unit, an indication of at least one service condition of the first user equipment; or receiving, by the Distributed Unit, an indication of at least one service condition of the first user equipment, and wherein the at least one service condition of the first user equipment comprises at least one of: a capability of the first user equipment indicating that the first user equipment supports non-orthogonal multiple access transmission; a quality of service profile associated with the first user equipment; or Protocol Data Unit Session Information associated with the first user equipment.

Example 33: The method of example 32, wherein the at least one service condition of the first user equipment comprises the quality of service profile associated with the first user equipment; wherein the receiving the indication of the at least one service condition of the first user equipment comprises receiving the quality of service profile associated with the first user equipment; and wherein the base station configuring the first user equipment to perform non-orthogonal multiple access transmission further comprises configuring, by the Central Unit, the first user equipment according to the quality of service profile.

Example 34: The method of example 32 or example 33, wherein the at least one service condition of the first user equipment comprises the Protocol Data Unit Session Information associated with the first user equipment; wherein the receiving the indication of the at least one service condition of the first user equipment comprises receiving the Protocol Data Unit Session Information associated with the first user equipment; and wherein the base station configuring the first user equipment to perform non-orthogonal multiple access transmission further comprises configuring, by the Central Unit, the first user equipment according to the Protocol Data Unit Session Information.

Example 35: The method of any of examples 32-34, wherein the receiving, by the base station, of the first trigger relating to a first user equipment comprises receiving, by the Central Unit, the first trigger relating to a first user equipment; wherein the receiving, by the Central Unit, of the indication of the at least one service condition comprises receiving the quality of service profile associated with the first user equipment; and wherein the method further comprises: transmitting, by the Central Unit, the non-orthogonal multiple access configuration, including the service condition to the Distributed Unit; and transmitting, by the Central Unit, the non-orthogonal multiple access configuration, including the quality of service profile associated with the first user equipment, to the user equipment to configure the first user equipment to perform non-orthogonal multiple access transmission according to the quality of service profile.

Example 36: The method of any of examples 32-34, wherein the receiving, by the base station, of the first trigger relating to a first user equipment comprises receiving, by the Central Unit, the first trigger relating to a first user equipment; wherein the receiving, by the Central Unit, of the indication of the at least one service condition comprises receiving the Protocol Data Unit Session Information associated with the first user equipment; and wherein the method further comprises: transmitting, by the Central Unit, the non-orthogonal multiple access configuration, including the service condition to the Distributed Unit; and transmitting, by the Central Unit, the non-orthogonal multiple access configuration, including the Protocol Data Unit Session Information associated with the first user equipment, to the user equipment to configure the first user equipment to perform non-orthogonal multiple access transmission according to the Protocol Data Unit Session Information.

Example 37: The method of any of examples 32-36, wherein the at least one service condition of the first user equipment comprises the capability of the first user equipment indicating that the first user equipment supports non-orthogonal multiple access transmission, and wherein the base station receiving the first trigger comprises at least one of: receiving, by the Central Unit, the service condition in a fourth message from at least one of the first user equipment, a core network node, or another base station; or receiving, by the Distributed Unit, the service condition in a fifth message from at least one of the first user equipment, or the Central Unit.

Example 38: The method of any of examples 31-37, wherein the base station receiving the first trigger comprises receiving at least one message on behalf of the first user equipment; and wherein the message received on behalf of the first user equipment comprises one or more measurement reports from the first user equipment.

Example 39: The method of any of examples 31-38, wherein the base station receiving the first trigger relating to the first user equipment comprises: receiving, by the base station, at least one uplink transmission from the first user equipment, wherein the at least one uplink transmission comprises at least one of: sounding reference signal transmissions, physical uplink control channel transmissions, or physical uplink shared channel transmissions.

Example 40: The method of example 39, further comprising: responsive to the base station receiving the at least one uplink transmission from the first user equipment, the Distributed Unit transmitting a request message to the Central Unit, wherein the request message includes a request for the Central Unit to configure the first user equipment to perform non-orthogonal multiple access transmission.

Example 41: The method of example 39 or example 40, further comprising: determining, by the Distributed Unit, if the first user equipment has an acceptable uplink channel condition according to the at least one uplink transmission, wherein responsive to determining that the first user equipment has an acceptable uplink channel condition, transmitting, by the Distributed Unit, a request message to the Central Unit for configuration of the first user equipment to perform non-orthogonal multiple access transmission.

Example 42: The method of any of examples 31-41, further comprising: performing, by the Distributed Unit, an activation check to determine if the first user equipment has activated non-orthogonal multiple access transmission; wherein, responsive to determining that the first user equipment has not activated non-orthogonal multiple access transmission, transmitting, by the Distributed Unit, a non-orthogonal multiple access activation command to the first user equipment; and wherein the non-orthogonal multiple access activation command comprises at least one of Downlink Control Information or a Media Access Control-Control Element.

Example 43: The method of any of examples 31-42, further comprising: configuring, by the base station, a second user equipment to perform non-orthogonal multiple access transmission; receiving, by the base station, a combined signal including a first signal from the first user equipment with a first multiple access signature on a first transmission occasion and a second signal from the second user equipment with a second multiple access signature on a second transmission occasion; and utilizing, by the base station, a multiple-user detection receiver to recover the first signal and the second signal from the combined signal.

Example 44: The method of example 43, further comprising: transmitting, by the base station, a first control message to the first user equipment, wherein the first control message contains a first activation/deactivation indicator; transmitting, by the base station, a second control message to the second user equipment, wherein the second control message contains a second activation/deactivation indicator; receiving, by the base station, a first signal with a first multiple access signature on a first transmission occasion from the first user equipment; receiving, by the base station, a second signal with a second multiple access signature on a second transmission occasion from the second user equipment; receiving, by the base station, a combined signal including the first signal and the second signal; and recovering, by the base station, at least one of the first signal or the second signal from the combined signal.

Example 45: The method of example 44, further comprising: receiving, by the base station, a combined signal including a first signal from the first user equipment with a first multiple access signature on a first transmission occasion and a second signal from the second user equipment with a second multiple access signature on a second transmission occasion; and utilizing, by the base station, a multiple-user detection receiver to recover the first signal and the second signal from the combined signal.

Example 46: The method of any of examples 31-45, further comprising: configuring, by the base station, a second user equipment to perform non-orthogonal multiple access transmission.

Example 47: The method of example 46, further comprising: transmitting, by the base station, the first control message to the second user equipment during a transmission occasion for the first user equipment.

Example 48: The method of example 43, further comprising: receiving, by the base station, at least one of a scheduling request or a buffer status report from the first user equipment; transmitting, by the base station, a first uplink grant in a first uplink grant message to the first user equipment, the first uplink grant message configuring the first user equipment to transmit in non-orthogonal multiple access simultaneously with the second user equipment according to the scheduling request or buffer status report; transmitting, by the base station, a second uplink grant in a second uplink grant message to the second user equipment, the second uplink grant message configuring the second user equipment to transmit in non-orthogonal multiple access simultaneously with the first user equipment; receiving, by the base station, a combined signal including a first signal from the first user equipment and a second signal from the second user equipment; and recovering, by the base station, at least one of the first signal or the second signal from the combined signal.

Example 49: A base station comprising: a processor; and a computer-readable storage media having stored thereon instructions that, responsive to execution by the processor, cause the processor to execute the method of any of examples 31 to 48.

Example 50: A method for configuration of user equipment for non-orthogonal multiple access transmission by a base station, the method comprising: receiving, by the base station, a first trigger relating to a first user equipment; generating, by the base station, a non-orthogonal multiple access configuration, wherein the non-orthogonal multiple access configuration includes a plurality of multiple access signatures and transmission occasions information for non-orthogonal multiple access transmission; and responsive to the first trigger, configuring, by the base station, the first user equipment to perform non-orthogonal multiple access transmission by at least one of: a Central Unit of the base station transmitting a first message including the non-orthogonal multiple access configuration to a Distributed Unit of the base station and transmitting a second message including the non-orthogonal multiple access configuration to the first user equipment; the Central Unit transmitting the second message including the non-orthogonal multiple access configuration to the first user equipment; or the Distributed Unit transmitting a third message including the non-orthogonal multiple access configuration to the Central Unit and the Central Unit transmitting a fourth message including the non-orthogonal multiple access configuration to the first user equipment.

CONCLUSION

Although techniques and apparatuses for non-orthogonal multiple access (NOMA) configuration procedures in split base station architectures have been described in language specific to features and/or methods, it is to be understood that the subject of the appended claims is not necessarily limited to the specific features or methods described. Rather, the specific features and methods are disclosed as example implementations of NOMA configuration procedures in split base station architectures.

What is claimed is:

1. A method comprising:
    receiving, by a base station, a first trigger relating to a first user equipment;
    generating, by the base station, a non-orthogonal multiple access configuration, wherein the non-orthogonal multiple access configuration includes a plurality of multiple access signatures and transmission occasions information for non-orthogonal multiple access transmission; and
    responsive to the first trigger, sending, by the base station, the non-orthogonal multiple access configuration to the first user equipment to perform non-orthogonal multiple access transmission by at least one of:
        a Central Unit of the base station transmitting a first message including the non-orthogonal multiple access configuration to a Distributed Unit of the base station;
        the Central Unit transmitting a second message including the non-orthogonal multiple access configuration to the first user equipment; or
        the Distributed Unit transmitting a third message including the non-orthogonal multiple access configuration to the Central Unit; and
        the Central Unit (121) transmitting a fourth message (734) including the non-orthogonal multiple access configuration to the first user equipment.

2. The method of claim 1:
    wherein the receiving the first trigger relating to the first user equipment comprises at least one of:
        receiving, by the Central Unit, an indication of at least one service condition of the first user equipment; or
        receiving, by the Distributed Unit, an indication of at least one service condition of the first user equipment, and
    wherein the at least one service condition of the first user equipment comprises at least one of:
        a capability of the first user equipment indicating that the first user equipment supports non-orthogonal multiple access transmission;
        a quality of service profile associated with the first user equipment; or
        Protocol Data Unit Session Information associated with the first user equipment.

3. The method of claim 2:
    wherein the at least one service condition of the first user equipment comprises the quality of service profile associated with the first user equipment;
    wherein the receiving the indication of the at least one service condition of the first user equipment comprises receiving the quality of service profile associated with the first user equipment; and
    wherein the base station sending the non-orthogonal multiple access configuration to the first user equipment to perform non-orthogonal multiple access transmission further comprises configuring, by the Central Unit, the first user equipment according to the quality of service profile.

4. The method of claim 2:
    wherein the at least one service condition of the first user equipment comprises the Protocol Data Unit Session Information associated with the first user equipment;
    wherein the receiving the indication of the at least one service condition of the first user equipment comprises receiving the Protocol Data Unit Session Information associated with the first user equipment; and
    wherein the base station sending the non-orthogonal multiple access configuration to the first user equipment to perform non-orthogonal multiple access transmission further comprises configuring, by the Central Unit, the first user equipment according to the Protocol Data Unit Session Information.

5. The method of claim 2:
    wherein the receiving, by the base station, of the first trigger relating to a first user equipment comprises receiving, by the Central Unit, the first trigger relating to a first user equipment;
    wherein the receiving, by the Central Unit, of the indication of the at least one service condition comprises receiving the quality of service profile associated with the first user equipment; and wherein the method further comprises:
transmitting, by the Central Unit, the non-orthogonal multiple access configuration, including the service condition to the Distributed Unit; and
transmitting, by the Central Unit, the non-orthogonal multiple access configuration, including the quality of service profile associated with the first user equipment, to the user equipment to configure the first user equipment to perform non-orthogonal multiple access transmission according to the quality of service profile.

6. The method of claim 2:
wherein the receiving, by the base station, of the first trigger relating to a first user equipment comprises receiving, by the Central Unit, the first trigger relating to a first user equipment;
wherein the receiving, by the Central Unit, of the indication of the at least one service condition comprises receiving the Protocol Data Unit Session Information associated with the first user equipment; and
wherein the method further comprises:
transmitting, by the Central Unit, the non-orthogonal multiple access configuration, including the service condition to the Distributed Unit; and
transmitting, by the Central Unit, the non-orthogonal multiple access configuration, including the Protocol Data Unit Session Information associated with the first user equipment, to the user equipment to configure the first user equipment to perform non-orthogonal multiple access transmission according to the Protocol Data Unit Session Information.

7. The method of claim 2:
wherein the at least one service condition of the first user equipment comprises the capability of the first user equipment indicating that the first user equipment supports non-orthogonal multiple access transmission, and
wherein the base station receiving the first trigger comprises at least one of:
receiving, by the Central Unit, the service condition in a fifth message from at least one of the first user equipment, a core network node, or another base station; or
receiving, by the Distributed Unit, the service condition in a sixth message from at least one of the first user equipment, or the Central Unit.

8. The method of claim 1:
wherein the base station receiving the first trigger comprises receiving at least one message on behalf of the first user equipment; and
wherein the message received on behalf of the first user equipment comprises one or more measurement results from the first user equipment.

9. The method of claim 1, further comprising:
receiving, by the base station, at least one uplink transmission from the first user equipment; and
responsive to the base station receiving the at least one uplink transmission from the first user equipment, the Distributed Unit transmitting a request message to the Central Unit, wherein the request message includes a request for the Central Unit to configure the first user equipment to perform non-orthogonal multiple access transmission.

10. The method of claim 1, further comprising:
receiving, by the base station, at least one uplink transmission from the first user equipment;
determining, by the Distributed Unit, if the first user equipment has an acceptable uplink channel condition according to the at least one uplink transmission; and
wherein responsive to determining that the first user equipment has the acceptable uplink channel condition, transmitting, by the Distributed Unit, a request message to the Central Unit for configuration of the first user equipment to perform non-orthogonal multiple access transmission.

11. The method of claim 1, further comprising:
performing, by the Distributed Unit, an activation check to determine if the first user equipment has activated non-orthogonal multiple access transmission; and
wherein, responsive to determining that the first user equipment has not activated non-orthogonal multiple access transmission, transmitting, by the Distributed Unit, a non-orthogonal multiple access activation command to the first user equipment,
wherein the non-orthogonal multiple access activation command comprises at least one of:
Downlink Control Information; or
a Media Access Control-Control Element.

12. The method of claim 1, further comprising:
sending, by the base station, a non-orthogonal multiple access configuration to a second user equipment to perform non-orthogonal multiple access transmission;
receiving, by the base station, a combined signal including a first signal from the first user equipment with a first multiple access signature on a first transmission occasion and a second signal from the second user equipment with a second multiple access signature on a second transmission occasion; and
recovering, by the base station, at least one of the first signal or the second signal from the combined signal.

13. The method of claim 12, further comprising:
transmitting, by the base station, a first control message to the first user equipment, wherein the first control message contains a first activation/deactivation indicator;
transmitting, by the base station, a second control message to the second user equipment, wherein the second control message contains a second activation/deactivation indicator;
receiving, by the base station, a first signal with a first multiple access signature on a first transmission occasion from the first user equipment;
receiving, by the base station, a second signal with a second multiple access signature on a second transmission occasion from the second user equipment;
receiving, by the base station, a combined signal including the first signal and the second signal; and
utilizing, by the base station, a multiple-user detection receiver to recover the first signal and the second signal from the combined signal.

14. A base station comprising:
a processor; and
a computer-readable storage media having stored thereon instructions that, responsive to execution by the processor, cause the processor to perform operations comprising:
receive a first trigger relating to a first user equipment;
generate a non-orthogonal multiple access configuration, wherein the non-orthogonal multiple access configuration includes a plurality of multiple access signatures and transmission occasions information for non-orthogonal multiple access transmission; and
responsive to the first trigger, send the non-orthogonal multiple access configuration to the first user equipment to perform non-orthogonal multiple access transmission, configuration of the first user equipment to perform non-orthogonal multiple access transmission further comprising at least one of:
  transmit, by a Central Unit of the base station, a first message including the non-orthogonal multiple access configuration to a Distributed Unit of the base station; or
  transmit, by the Central Unit, a second message including the non-orthogonal multiple access configuration to the first user equipment; or
  transmit, by the Distributed Unit, a third message including the non-orthogonal multiple access configuration to the Central Unit; and
  transmit, by the Central Unit a fourth message including the non-orthogonal multiple access configuration to the first user equipment.

15. The base station of claim 14:
wherein the operation of receive the first trigger relating to a first user equipment further comprises at least one of:
  receive, by the Central Unit, an indication of at least one service condition of the first user equipment; or
  receive, by the Distributed Unit, an indication of at least one service condition of the first user equipment, and
wherein the at least one service condition of the first user equipment comprises at least one of:
  a capability of the first user equipment indicating that the first user equipment supports non-orthogonal multiple access transmission;
  a quality of service profile associated with the first user equipment; or
  Protocol Data Unit Session Information associated with the first user equipment.

16. The base station of claim 15:
wherein the operation of receive the first trigger relating to a first user equipment further comprises:
  receive, by the Central Unit, the first trigger relating to a first user equipment, and
wherein the operation of receive, by the Central Unit, the indication of the at least one service condition comprises:
  receive the quality of service profile associated with the first user equipment, and
wherein the processor performs operations further comprising:
  transmit, by the Central Unit, the non-orthogonal multiple access configuration, including the service condition to the Distributed Unit; and
  transmit, by the Central Unit, the non-orthogonal multiple access configuration, including the quality of service profile associated with the first user equipment, to the user equipment to configure the first user equipment to perform non-orthogonal multiple access transmission according to the quality of service profile.

17. The base station of claim 15:
wherein the operation of receive the first trigger relating to a first user equipment further comprises:
  receive, by the Central Unit, the first trigger relating to a first user equipment, and
wherein the operation of receive, by the Central Unit, the indication of the at least one service condition further comprises:
  receive the Protocol Data Unit Session Information associated with the first user equipment, and
wherein the processor performs operations further comprising:
  transmit, by the Central Unit, the non-orthogonal multiple access configuration, including the service condition to the Distributed Unit; and
  transmit, by the Central Unit, the non-orthogonal multiple access configuration, including the Protocol Data Unit Session Information associated with the first user equipment, to the user equipment to configure the first user equipment to perform non-orthogonal multiple access transmission according to the Protocol Data Unit Session Information.

18. The base station of claim 14, further comprising the processor performing operations further comprising:
  receive at least one uplink transmission from the first user equipment; and
  responsive to the base station receiving the at least one uplink transmission from the first user equipment, transmit, by the Distributed Unit, a request message to the Central Unit, wherein the request message includes a request for the Central Unit to configure the first user equipment to perform non-orthogonal multiple access transmission.

19. The base station of claim 14, further comprising the processor performing operations further comprising:
  receive at least one uplink transmission from the first user equipment;
  determine, by the Distributed Unit, if the first user equipment has an acceptable uplink channel condition according to the at least one uplink transmission; and
  wherein responsive to determining that the first user equipment has the acceptable uplink channel condition, transmit, by the Distributed Unit, a request message to the Central Unit for configuration of the first user equipment to perform non-orthogonal multiple access transmission.

20. The base station of claim 14, further comprising the processor performing operations further comprising:
  perform, by the Distributed Unit, an activation check to determine if the first user equipment has activated non-orthogonal multiple access transmission; and
  wherein, responsive to determining that the first user equipment has not activated non-orthogonal multiple access transmission, transmit, by the Distributed Unit, a non-orthogonal multiple access activation command to the first user equipment,
  wherein the non-orthogonal multiple access activation command comprises at least one of:
    Downlink Control Information; or
    a Media Access Control-Control Element.

* * * * *